(12) United States Patent
Tachiiri et al.

(10) Patent No.: US 7,121,633 B2
(45) Date of Patent: Oct. 17, 2006

(54) ELECTRIC PARKING BRAKE APPARATUS

(75) Inventors: Yoshikazu Tachiiri, Chiryu (JP); Nobuhiro Asai, Aichi-ken (JP); Yoshitami Saito, Aichi-ken (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/703,416

(22) Filed: Nov. 10, 2003

(65) Prior Publication Data

US 2004/0090112 A1 May 13, 2004

(30) Foreign Application Priority Data

Nov. 11, 2002 (JP) ............... 2002-326586

(51) Int. Cl.
*B60T 13/66* (2006.01)
(52) U.S. Cl. ....................... 303/20
(58) Field of Classification Search ............ 303/20
See application file for complete search history.

(56) References Cited

U.S. PATENT DOCUMENTS

| | | | | |
|---|---|---|---|---|
| 5,090,518 | A | * 2/1992 | Schenk et al. | 188/72.1 |
| 5,139,315 | A | 8/1992 | Walenty et al. | |
| 5,180,038 | A | * 1/1993 | Arnold et al. | 188/171 |
| 6,015,194 | A | * 1/2000 | Decker | 303/155 |
| 6,305,511 | B1 | * 10/2001 | McCann et al. | 188/265 |
| 6,390,571 | B1 | * 5/2002 | Murphy | 303/126 |
| 6,406,102 | B1 | * 6/2002 | Arnold | 303/20 |
| 6,425,643 | B1 | * 7/2002 | Shirai et al. | 303/112 |
| 6,478,118 | B1 | * 11/2002 | .ANG.strom et al. | 188/1.11 E |
| 6,582,030 | B1 | * 6/2003 | Harris | 303/3 |
| 6,598,943 | B1 | * 7/2003 | Harris | 303/113.4 |
| 6,702,405 | B1 | * 3/2004 | Balz et al. | 303/192 |
| 2001/0023799 | A1 | * 9/2001 | Engelhard | 188/151 R |
| 2002/0108816 | A1 | * 8/2002 | Taniguchi | 188/2 R |
| 2002/0117891 | A1 | * 8/2002 | Harris | 303/20 |

FOREIGN PATENT DOCUMENTS

| | | |
|---|---|---|
| DE | 196 32 863 A1 | 2/1998 |
| DE | 198 36 687 A1 | 8/1999 |
| DE | 100 25 731 A1 | 12/2000 |
| JP | 2001-322537 | 11/2001 |

\* cited by examiner

*Primary Examiner*—Robert A. Siconolfi
(74) *Attorney, Agent, or Firm*—Buchanan Ingersoll & Rooney PC

(57) ABSTRACT

An electric parking brake control unit of an electric parking brake apparatus has an input section for receiving signals for performing automatic activation and deactivation, but does not have a determination function and a circuit for inputting signals from various sensors, which are necessary to determine whether to start the automatic activation/deactivation control. Therefore, when used in a vehicle which does not require an automatic control function and requires only a manual control function, the electric parking brake control unit can be used solely, with no signal line connected to the input section. When used in a vehicle which requires both the automatic control function and the manual control function, the input section is connected to a second control unit that can output signals for performing automatic activation and deactivation, whereby the electric parking brake control unit operates in cooperation with the second control unit.

14 Claims, 8 Drawing Sheets

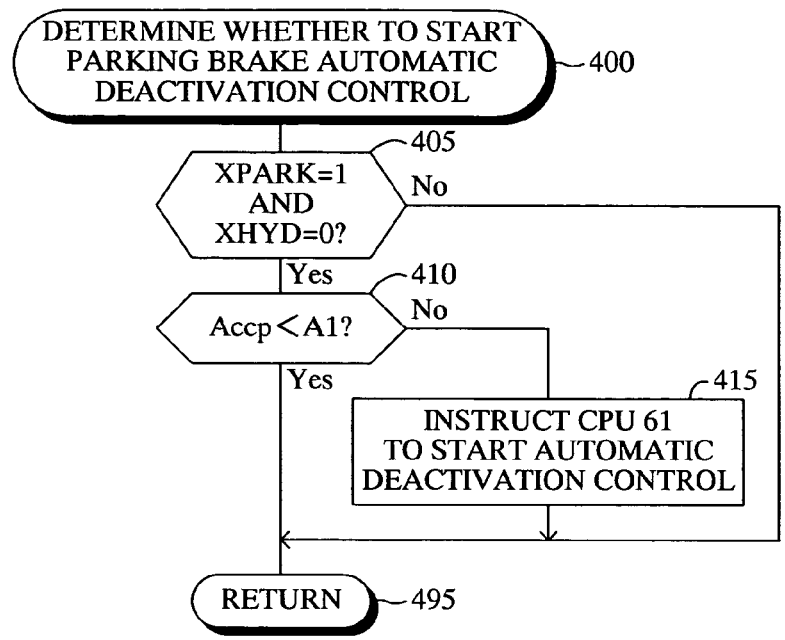
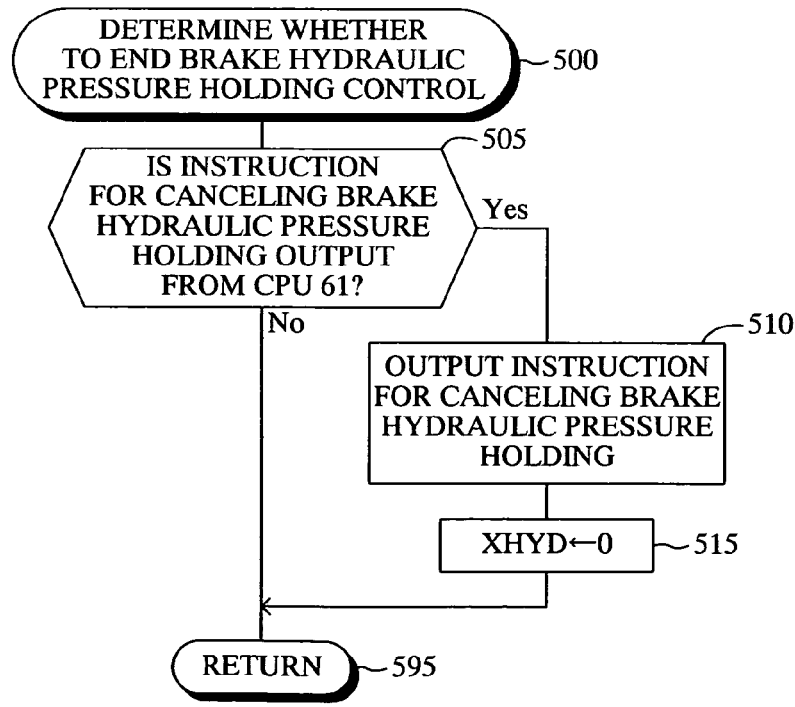

ELECTRIC PARKING BRAKE APPARATUS

BACKGROUND OF THE INVENTION

1. Field of the Invention

The present invention relates to an electric parking brake apparatus capable of activating and deactivating a parking brake of a vehicle by use of electric drive means such as an electric motor.

2. Description of Related Art

Japanese Patent Application Laid-Open (kokai) No. 2001-322537 discloses a conventional electric parking brake apparatus of such a type. The disclosed apparatus includes an electric parking brake control unit, which receives a parking brake activation-deactivation signal generated upon operation of a manual switch and which drives an electric motor on the basis of the signal to thereby activate and deactivate a parking brake.

Further, the electric parking brake control unit is connected to various sensors mounted on the vehicle, and is configured to determine, on the basis of signals from the sensors, whether a condition for starting automatic activation of the parking brake or a condition for starting automatic deactivation of the parking brake is satisfied, and when either of the conditions is satisfied, the electric parking brake control unit automatically activates or deactivates the parking brake in accordance with the satisfied condition. In other words, the conventional apparatus equipped with the above-described electric parking brake control unit is designed to activate or deactivate the parking brake by means of a function of manually controlling the parking brake in response to switch operation (hereinafter referred to as "manual control function"), as well as by means of a function of automatically controlling the parking brake on the basis of signals from various sensors (hereinafter referred to as "automatic control function").

However, since the electric parking brake control unit of the above-described conventional apparatus includes various input circuits for receiving signals from various sensors and a complicated determination function for determining whether the automatic activation start condition is satisfied, which circuits and function are necessary for accomplishing the above-described automatic control function, the control unit has problems in that the unit is large and of complex configuration.

Some vehicles which carry an electric parking brake apparatus do not require any automatic control function, and in such vehicles, use of the above-described electric parking brake control unit having an automatic control function is not required. In other words, in the case where, among vehicles which carry an electric parking brake apparatus, some vehicles require the automatic control function and the remaining vehicles do not require the automatic control function, there has been a problem in that two types of electric parking brake control units must be prepared; i.e., an electric parking brake control unit having both a manual control function and an automatic control function as described above, and an electric parking brake control unit having only a manual control function and not having an automatic control function.

SUMMARY OF THE INVENTION

In view of the foregoing, an object of the present invention is to provide an electric parking brake apparatus including an electric parking brake control unit which can be applied to both a vehicle requiring an automatic control function and a vehicle not requiring an automatic control function and which is compact and of simple configuration.

In order to achieve the above object, the present invention provides an electric parking brake apparatus which comprises: a parking brake of a vehicle; electric drive means for activating and deactivating the parking brake; a manually operated member for generating signals which instructs activation and deactivation of the parking brake; and an electric parking brake control unit for controlling the electric drive means on the basis of the signal. The electric parking brake control unit includes an input section for receiving signals output from a second control unit mounted on the vehicle and instructing automatic activation and automatic deactivation of the parking brake.

In the present specification, the term "manual" refers to a situation in which at least parking brake activation control (control for bringing the parking brake from a deactivated state to an activated state) and parking brake deactivation control (control for bringing the parking brake from an activated state to a deactivated state) are started in direct response to an operation (e.g., switch operation) performed by a driver (human) for starting the activation control and the deactivation control, whereas the term "automatic" refers to a situation in which at least the parking brake activation control and the parking brake deactivation control are each started upon satisfaction of a predetermined condition, independently of operation performed by the driver.

In the above-described configuration, since the electric parking brake control unit includes only the input section for receiving a signal output from another control unit and instructing automatic activation and automatic deactivation of the parking brake, and does not include any substantial automatic control function, the electric parking brake control unit includes neither various input circuits for receiving signals from various sensors, nor the above-described complex determination function, which circuits and function are necessary for accomplishing the automatic control function. Therefore, the electric parking brake control unit can be reduced in size, and its configuration can be simplified.

Further, since the electric parking brake control unit can control the electric drive means on the basis of the signal generated by means of the manually operated member and instructing activation and deactivation of the parking brake, the electric parking brake control unit can be used solely, with nothing connected to the input section, for vehicles which do not require an automatic control function but only require a manual control function. Moreover, when the electric parking brake control unit is used for a vehicle which requires both an automatic control function and a manual control function, a second control unit (having a substantial automatic control function) configured to output signals for instructing automatic activation and automatic deactivation of the parking brake is mounted on the vehicle, and the above-described input section is connected to the second control unit, whereby the electric parking brake control unit can be operated in cooperation with the second control unit. By virtue of the above-described configuration, the electric parking brake control unit of a single type can be applied to both vehicles which require an automatic control function and vehicles which do not require any automatic control function.

In this case, preferably, the second control unit to be mounted on a vehicle to which the electric parking brake apparatus is applied is a brake hydraulic pressure control unit capable of controlling hydraulic braking force applied to respective wheels of the vehicle, independently of operation of a brake pedal. The brake hydraulic pressure control unit is configured in such a manner that when a predetermined condition for starting parking brake automatic activation (hereinafter referred to as a "parking-brake-automatic-activation start condition") is satisfied, the brake hydraulic pressure control unit maintains, for a predetermined period of time, a state in which a predetermined hydraulic braking force for stopping the vehicle and holding the vehicle in a stopped state is applied to the respective wheels independently of operation of the brake pedal, and outputs a signal for instructing automatic activation of the parking brake after elapse of the predetermined period of time; and the input section of the electric parking brake control unit is connected to the brake hydraulic pressure control unit in order to receive a signal output from the brake hydraulic pressure control unit and instructing automatic activation of the parking brake.

In general, the electric parking brake apparatus is configured to activate or deactivate the parking brake by moving, over a predetermined distance, a first end of a wire whose second end is connected to the parking brake, by use of an electric motor. Accordingly, an operation of bringing the parking brake from a deactivated state to an activated state (or from an activated state to a deactivated state) requires a predetermined time corresponding to a time required for the first end of the wire to move over the predetermined distance.

Accordingly, if the conventional electric parking brake apparatus having the above-described automatic control function is designed to immediately start a control for activating the parking brake upon satisfaction of a predetermined parking-brake-automatic-activation start condition, the following problem occurs. Specifically, for example, in a case where a vehicle travels at very slow speed, while stopping frequently, on a congested road, if the parking-brake-automatic-activation start condition (e.g., continuation, over a predetermined time, of a state in which the vehicle is stopped because of operation of the brake pedal by the driver) is satisfied at one time, and within a short period of time, a parking-brake-automatic-deactivation start condition (e.g., operation of the accelerator pedal by the driver) is subsequently satisfied, the parking brake fails to enter a deactivated state, thereby making it difficult for the driver to start the vehicle smoothly. In addition, the above operation leads to unnecessary activation of the parking brake.

Furthermore, in a case where the driver releases the brake pedal immediately after satisfaction of the parking-brake-automatic-activation start condition, in some cases the braking force produced by means of brake hydraulic pressure may be removed before the parking brake enters an activated state, whereby there may be produced a period in which the stopped state of the vehicle cannot be maintained.

In contrast, in general, in a brake hydraulic pressure control effected by a brake hydraulic pressure control unit, non-compressible fluid is used as brake fluid. Therefore, when a control for relieving the applied brake hydraulic pressure (e.g., a control for opening a pressure reducing valve for reducing the hydraulic pressure within wheel cylinders) is performed, the brake hydraulic pressure is immediately relieved. Further, when a control for applying a brake hydraulic pressure (e.g., a control for opening a pressure increasing valve for increasing the hydraulic pressure within the wheel cylinders) is performed, the brake hydraulic pressure is immediately increased.

Accordingly, the electric parking brake apparatus of the present invention is configured in the above-described manner; i.e., in such a manner that when a predetermined parking-brake-automatic-activation start condition is satisfied, a state in which a predetermined hydraulic braking force for stopping the vehicle and holding it in a stopped state is applied to the respective wheels is first maintained for a predetermined period of time, and after elapse of the predetermined period of time, a signal for instructing automatic activation of the parking brake is output. Therefore, even in the above-described example case in which a parking-brake-automatic-deactivation start condition is satisfied before elapse of the predetermined time (within a short period of time) after satisfaction of a parking-brake-automatic-activation start condition, the braking force generated by means of brake hydraulic pressure can be removed immediately by performing, as parking brake automatic deactivation control, a control for relieving the brake hydraulic pressure, whereby the driver can start the vehicle smoothly. Further, since unnecessary activation of the parking brake is prevented, the durability of the electric drive means (e.g., an electric motor) is improved. Furthermore, when the driver releases the brake pedal immediately after satisfaction of the parking-brake-automatic-activation start condition, a braking force generated by means of brake hydraulic pressure is applied to the respective wheels immediately after satisfaction of the condition, whereby the vehicle can be reliably stopped and held in a stopped state.

In the electric parking brake apparatus of the present invention, preferably, the electric parking brake control unit comprises failure detection means for detecting generation of a predetermined failure in the electric parking brake apparatus and identifying the details of the failure, and is connected to the second control unit so as to output to the second control unit a signal corresponding to the details of the failure.

In general, a control unit (controller), such as an electric parking brake control unit, often includes an onboard diagnosis function for storing (diagnosing) the details of a failure relating to the control unit. However, in order to realize such an onboard diagnosis function, the control unit must include a storage device for storing an anomaly code corresponding to the details of a failure, and a dedicated diagnosis signal output port for outputting the anomaly code stored in the storage device. As a result, the conventional control unit has problems of having a large size and a complicated configuration.

In contrast, in the case where the electric parking brake control unit is configured to detect generation of a predetermined failure in the electric parking brake apparatus and identify the details of the failure, and is connected to the second control unit so as to output to the second control unit a signal corresponding to the details of the failure, diagnosis of a failure relating to the electric parking brake apparatus can be executed, while a diagnosis signal output port provided in the second control unit is utilized. As a result, the electric parking brake control unit is not required to include the above-described storage device, dedicated diagnosis signal output port, etc. Accordingly, the electric parking brake control unit can be further reduced in size and further simplified in configuration.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 4 is a flowchart showing a routine which the CPU91 of the brake hydraulic pressure control unit executes in order to determine whether to start parking-brake automatic deactivation control;

FIG. 5 is a flowchart showing a routine which the CPU91 of the brake hydraulic pressure control unit executes in order to determine whether to end the brake hydraulic pressure holding control;

DESCRIPTION OF THE PREFERRED EMBODIMENT

Figure 1:
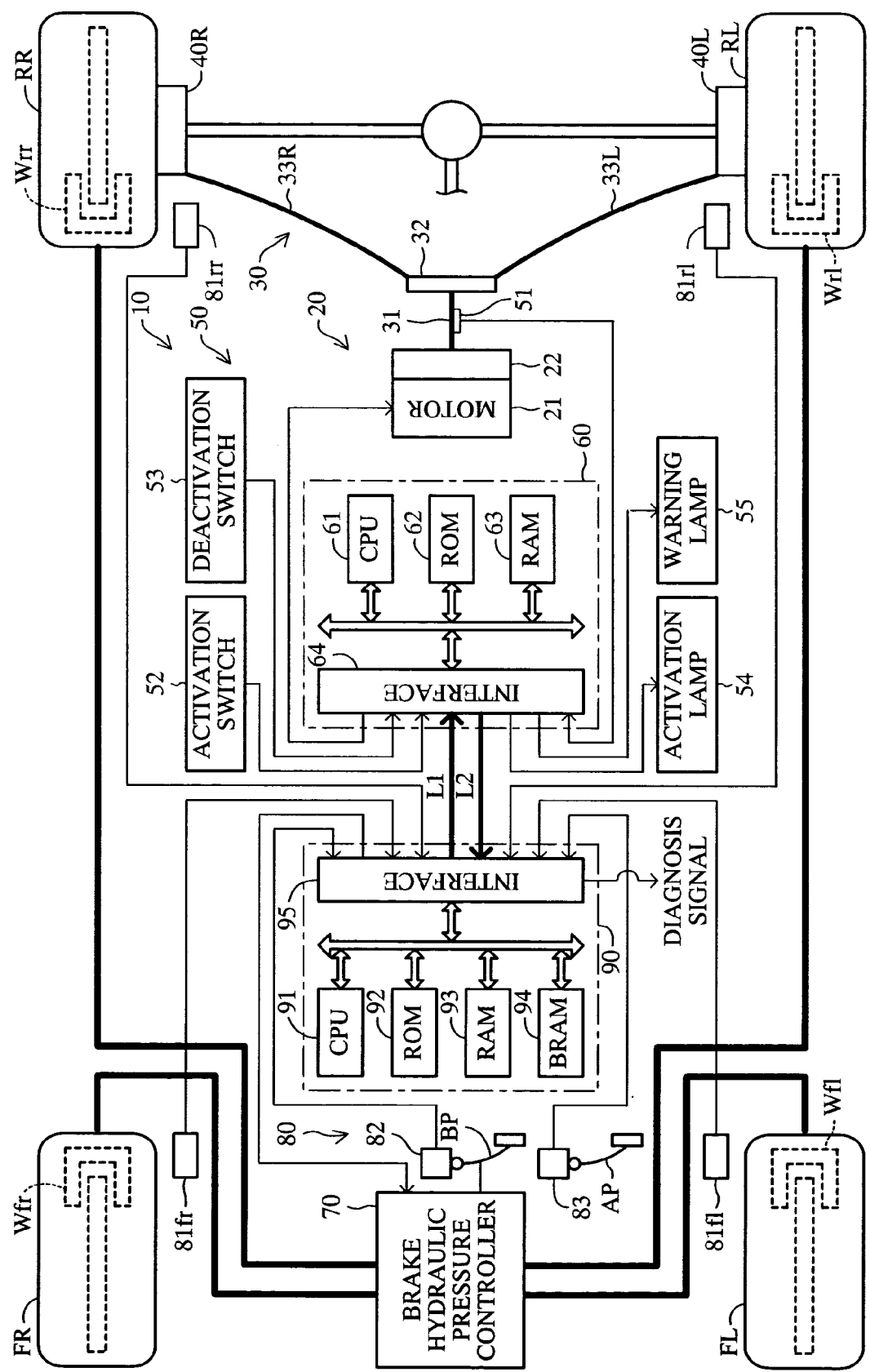
FIG. 1 is a schematic diagram of a vehicle on which is mounted an electric parking brake apparatus according to an embodiment of the present invention.

An embodiment of the present invention will now be described with reference to the drawings. FIG. 1 schematically shows the configuration of a vehicle on which is mounted an electric parking brake apparatus 10 according to the embodiment of the present invention. The vehicle is a four-wheel vehicle which has two front wheels (a front left wheel FL and a front right wheel FR) and two rear wheels (a rear left wheel RL and a rear right wheel RR) and which requires both the above-described automatic control function and the above-described manual control function.

The electric parking brake apparatus 10 includes a drive actuator section 20, a wire structure section 30, left-hand and right-hand parking brakes 40L and 40R provided adjacent to the two rear wheels, respectively, a sensor-switch-lamp system 50, and an electric parking brake control unit 60.

The drive actuator section 20 includes an electric motor 21 and a speed reduction mechanism 22. The electric motor 21 serves as electric drive means, and can rotate in forward and reverse directions. The speed reduction mechanism 22 comprises a plurality of gear trains and is adapted to permit transmission of drive torque of the electric motor 21 to the wire structure section 30, while preventing transmission of tensile force of the wire structure section 30 to the electric motor 21.

The wire structure section 30 includes a base wire 31, a balancer 32, a left-hand wire 33L, and a right-hand wire 33R. A first end of the base wire 31 is connected to the speed reduction mechanism 22, whereas a second end of the base wire 31 is connected to a center portion of one side of the balancer 32. First ends of the left-hand and right-hand wires 33L and 33R are connected to opposite ends of the other side of the balancer 32, whereas second ends of the left-hand and right-hand wires 33L and 33R are connected to the left-hand and right-hand parking brakes 40L and 40R, respectively.

The balancer 32 appropriately inclines in the yaw direction of the vehicle in such a manner that the tension of the left-hand wire 33L and that of the right-hand wire 33R are always equal to each other irrespective of an initial difference, or a difference developed over the course of time, in length between the left-hand wire 33L and the right-hand wire 33R.

The left-hand and right-hand parking brakes 40L and 40R apply to the rear left wheel RL and the rear right wheel RR, respectively, braking forces corresponding to the tensions of the left-hand and right-hand wires 33L and 33R, respectively (i.e., corresponding to the tension of the base wire 31). Accordingly, by virtue of the above-described action of the balancer 32, the left-hand and right-hand parking brakes 40L and 40R generate the same level of braking force. Since the specific structures and operations of the left-hand and right-hand parking brakes 40L and 40R used in the present embodiment are well known, their detailed descriptions are omitted here.

By virtue of the above-described configuration, when the electric motor 21 is driven to rotate in the forward direction, the first end of the base wire 31 is pulled toward the front of the vehicle, whereby the tension exerted on the wire structure section 30 increases, with a resultant increase in the braking force generated by each of the left-hand and right-hand parking brakes 40L and 40R. In contrast, when the electric motor 21 is driven to rotate in the reverse direction, the first end of the base wire 31 is returned toward the rear of the vehicle, whereby the tension exerted on the wire structure section 30 decreases, with a resultant decrease in the braking force generated by each of the left-hand and right-hand parking brakes 40L and 40R. In a state in which the electric motor 21 is not driven, because of the above-described action of the speed reduction mechanism 22, the tension currently exerted to the wire structure section 30 is maintained, whereby the braking force generated by each of the left-hand and right-hand parking brakes 40L and 40R is maintained at the current level.

The sensor-switch-lamp system 50 includes a tension sensor 51, an activation switch 52, a deactivation switch 53, an activation lamp 54, and a warning lamp 55. The tension sensor 51 detects the tension F of the base wire 31 and outputs a signal indicating the detected tension F. The activation switch 52 serves as a manually operated member which generates a signal for activating the parking brakes 40L and 40R. The deactivation switch 53 serves as a manually operated member which generates a signal for deactivating the parking brakes 40L and 40R. The activation lamp 54 turns on or off depending on the state of the parking brakes 40L and 40R (whether the parking brakes 40L and 40R are in an activated state (in which the parking brakes can stop the vehicle completely and maintain the stopped state) or in a deactivated state (in which the parking brakes produce no braking force)). The warning lamp 55 turns on when an anomaly occurs in the electric parking brake apparatus 10.

The activation switch 52 and the deactivation switch 53 are configured in such a manner that when one switch is in an operated position, the other switch cannot be operated. Therefore, there is no case where both the activation switch 52 and the deactivation switch 53 are simultaneously operated.

The electric parking brake control unit 60 is a microcomputer including a CPU 61, ROM 62, RAM 63, an interface 64, etc., which are connected with one another via a bus. Routines (programs) to be executed by the CPU 61, tables (lookup tables, maps), constants, etc., are stored in the ROM 62 in advance. When necessary, the CPU 61 temporarily stores data in the RAM 63. The interface 64 includes AD converters.

The interface 64 is connected to the tension sensor 51, the activation switch 52, and the deactivation switch 53, in order to supply signals from the tension sensor 51, etc. to the CPU 61. Further, in accordance with instructions from the CPU 61, the interface 64 feeds a drive signal to the electric motor 21, and turn-on signals or the like to the activation lamp 54 and the warning lamp 55. The above is the schematic configuration of the electric parking brake apparatus 10 of the present embodiment.

Moreover, the vehicle is provided with a brake hydraulic pressure control system. The hydraulic pressure control system includes a brake hydraulic pressure controller 70 consisting of a plurality of solenoid valves, etc.; a sensor section 80; and a brake hydraulic pressure control unit 90 serving as a second control unit.

In a normal state, the brake hydraulic pressure controller 70 supplies to respective wheel cylinders Wfl, Wfr, Wrl, and Wrr a brake hydraulic pressure corresponding to the operation force of a brake pedal BP. Further, the brake hydraulic pressure controller 70 can individually increase, hold, or decrease the brake hydraulic pressures of the wheel cylinders Wfl, Wfr, Wrl, and Wrr of the respective wheels, independently of operation of the brake pedal BP, in order to individually apply predetermined braking forces to the respective wheels. Accordingly, well known ABS control, traction control, etc. are performed by means of the brake hydraulic pressure controller 70 in accordance with the traveling conditions, etc. of the vehicle. Since the specific structure and operation of the brake hydraulic pressure controller 70 used in the present embodiment are well known, their detailed descriptions are omitted here.

The sensor section 80 includes wheel speed sensors 81$fl$, 81$fr$, 81$rl$, and 81$rr$, a brake switch 82, and an accelerator opening sensor 83. The wheel speed sensors 81$fl$, 81$fr$, 81$rl$, and 81$rr$ are formed by corresponding rotary encoders which respectively output pulse signals every time the wheels FL, FR, RL, and RR each rotate by a predetermined angle. The brake switch 82 detects whether or not the brake pedal BP is operated by a driver, and outputs a signal indicating that braking operation is currently performed. The accelerator opening sensor 83 detects an amount by which an accelerator pedal AP is operated by the driver, and outputs a signal indicating the operation amount Accp of the accelerator pedal AP.

As in the case of the above-described electric parking brake control unit 60, the brake hydraulic pressure control unit 90 is a microcomputer including a CPU 91, ROM 92, RAM 93, backup RAM 94, an interface 95, etc., which are connected with one another via a bus. Routines (programs) to be executed by the CPU 91, tables (lookup tables, maps), constants, etc., are stored in the ROM 92 in advance. When necessary, the CPU 91 temporarily stores data in the RAM 93. The backup RAM 94 stores data in a state in which the power supply is on, and holds the stored data even after the power supply is shut off. The interface 95 contains AD converters.

In order to allow the brake hydraulic pressure control unit 90 to achieve an onboard diagnosis function, the backup RAM 94 also serves as a storage device for storing an anomaly code or the like corresponding to the details of a failure. The anomaly code or the like stored in the backup RAM 94 can be output, as a diagnosis signal, to an external circuit (e.g., a diagnosis monitor or a checker) via a dedicated diagnosis signal output port provided in the interface 95.

The interface 95 is connected to the brake hydraulic pressure controller 70, and the sensors 81 to 83, and supplies signals from the sensors 81 to 83 to the CPU 91. Further, in accordance with instructions from the CPU 91, the interface 95 feeds drive signals to the respective solenoid values, etc. of the brake hydraulic pressure controller 70.

Moreover, the interface 95 is connected to the interface 64 of the electric parking brake control unit 60 via signal lines L1 and L2. In accordance with instructions from the CPU 91, the interface 95 outputs predetermined signals to the CPU 61 via the signal line L1 and the interface 64. Here, a portion of the interface 64 to which the signal line L1 is connected serves as an "input section" of the electric parking brake control unit 60. Meanwhile, the interface 64 outputs predetermined signals to the CPU 91 via the signal line L2 and the interface 95 in accordance with instructions from the CPU 61.

<Outline of Parking Brake Control by Automatic Control Function>

Automatic Activation Control:

The brake hydraulic pressure control unit 90 calculates an estimated vehicle body speed Vso on the basis of wheel speeds Vw of the respective wheels detected by the wheel speed sensors 81** and in accordance with the following Equation 1. Notably, in the present specification, the symbols "" appended to the ends of various variables, flags, symbols, etc. represent collective expressions of "fl," "fr," etc. which are appended to the ends of various variables, flags, symbols, etc. in order to indicate correspondence to the respective wheels FR, etc. For example, wheel speed Vw** collectively represents front-left-wheel speed Vwfl, front-right-wheel speed Vwfr, rear-left-wheel speed Vwrl, and rear-right-wheel speed Vwrr.

$$Vso = f(Vw^{**}) \qquad \text{Eq. 1}$$

In Equation 1, the function f is a function for calculating an estimated vehicle body speed Vso from wheel speeds Vw of the respective wheels, and, for example, the estimated vehicle body speed Vso is calculated to be equal to the maximum one of the wheel speeds Vw of the respective wheels.

When the estimated vehicle body speed Vso calculated as described above is zero and operation of the brake pedal BP has continued for a predetermined time T1, the brake hydraulic pressure control unit 90 determines that a brake-hydraulic-pressure-holding-control start condition, serving as a parking-brake-automatic-activation start condition, has been satisfied, and first executes brake hydraulic pressure holding control from the time at which the start condition has been satisfied.

Specifically, through control of the brake hydraulic pressure controller 70, the brake hydraulic pressure control unit 90 maintains the brake hydraulic pressures (predetermined brake hydraulic pressures) which were generated within the wheel cylinders Wfl, Wfr, Wrl, and Wrr of the respective wheels at the time when the above-described brake-hydraulic-pressure-holding-control start condition had been satisfied. Accordingly, after that point in time, the vehicle is maintained in a stopped state, even when the driver releases the brake pedal BP.

When a predetermined time T2 has elapsed after satisfaction of the brake-hydraulic-pressure-holding-control start condition, the brake hydraulic pressure control unit 90 outputs a parking-brake-automatic-activation-control start instruction (outputs a signal for automatically activating the parking brakes) to the electric parking brake control unit 60, while continuing the brake hydraulic pressure holding control (maintaining the respective brake hydraulic pressures).

Upon receipt of the parking-brake-automatic-activation-control start instruction from the brake hydraulic pressure control unit 90, the electric parking brake control unit 60 drives the electric motor 21 to rotate in the forward direction. As a result, the tension F of the base wire 31 starts to increase, whereby the braking forces of the left-hand and right-hand parking brakes 40L and 40R increase in accordance with the increased tension F of the base wire 31.

When the tension F of the base wire 31 becomes equal to or greater than a parking-brake-activation completion reference value Fhi (fixed value), the electric parking brake control unit 60 stops the electric motor 21. The parking-brake-activation completion reference value Fhi is set to correspond to a tension of the base wire 31 in a state in which the parking brakes 40L and 40R are in an activated state (in which the parking brakes 40L and 40R can stop the vehicle completely and maintain the stopped state). Accordingly, after that point in time, the parking brakes 40L and 40R are in the activated state, and the vehicle is stopped and maintained in the stopped state solely by the braking forces of the parking brakes 40L and 40R. Thus, the vehicle can be stopped and maintained in the stopped state even if the brake hydraulic pressures held by the brake hydraulic pressure holding control are relieved.

Accordingly, when the tension F of the base wire 31 exceeds a parking-brake-activation completion reference value Fhi, the electric parking brake control unit 60 outputs a brake-hydraulic-pressure-holding-control cancel instruction to the brake hydraulic pressure control unit 90. As a result, the brake hydraulic pressure control unit 90 cancels or stops the brake hydraulic pressure holding control, whereby the held brake hydraulic pressures are relieved. The above is the outline of the automatic activation control effected by the automatic control function.

Automatic Deactivation Control:

The brake hydraulic pressure control unit 90 outputs a parking-brake-automatic-deactivation-control start instruction to the electric parking brake control unit 60 when the driver operates the accelerator pedal AP in a state in which the parking brakes 40L and 40R are in the activated state (or during automatic activation control); specifically, when the operation amount Accp of the accelerator pedal AP becomes equal to or greater than a predetermined amount A1.

Upon receipt of the parking-brake-automatic-deactivation-control start instruction from the brake hydraulic pressure control unit 90, the electric parking brake control unit 60 drives the electric motor 21 to rotate in the reverse direction. As a result, the tension F of the base wire 31 starts to decrease, whereby the braking forces of the left-hand and right-hand parking brakes 40L and 40R decrease in accordance with the decreased tension F of the base wire 31.

When the tension F of the base wire 31 becomes equal to or less than a parking-brake-deactivation completion reference value Flow (fixed value), the electric parking brake control unit 60 stops the electric motor 21. The parking-brake-deactivation completion reference value Flow is set to correspond to a tension of the base wire 31 (e.g., "0") in a state in which the parking brakes 40L and 40R are in a deactivated state (in which the parking brakes 40L and 40R generate no braking force). Accordingly, after that point in time, the parking brakes 40L and 40R are in the deactivated state. The above is the outline of the automatic deactivation control effected by the automatic control function.

As described above, in the parking brake control effected by the automatic control function, the brake hydraulic pressure control unit 90 determines whether the parking brake automatic activation control or the parking brake automatic deactivation control is to be started, and instructs the electric parking brake control unit 60 to start the parking brake automatic activation control or the parking brake automatic deactivation control. Further, upon receipt of these instructions, the electric parking brake control unit 60 starts the parking brake automatic activation control or the parking brake automatic deactivation control. Subsequently, the electric parking brake control unit 60 determines whether the parking brake automatic activation control or the parking brake automatic deactivation control is to be ended, and accordingly ends the parking brake automatic activation control or the parking brake automatic deactivation control.

Specifically, the parking brake control by the automatic control function is executed through cooperation of the electric parking brake control unit 60 and the brake hydraulic pressure control unit 90. Further, the parking brake control by the automatic control function is performed only when an unillustrated ignition switch is "ON."

<Outline of Parking Brake Control by Manual Control Function>

Manual Activation Control:

When the activation switch 52 is once operated by the driver, the electric parking brake control unit 60 drives the electric motor 21 to rotate in the forward direction. As in the above-described automatic activation control, when the tension F of the base wire 31 becomes equal to greater than the parking-brake-activation completion reference value Fhi, the electric parking brake control unit 60 stops the electric motor 21. Accordingly, after that point in time, the parking brakes 40L and 40R are in the activated state, and the vehicle is stopped and maintained in the stopped state by the braking forces of the parking brakes 40L and 40R. The above is the outline of the manual activation control effected by the manual control function.

Manual Deactivation Control:

When the deactivation switch 53 is once operated by the driver, the electric parking brake control unit 60 drives the electric motor 21 to rotate in the reverse direction. As in the above-described automatic deactivation control, when the tension F of the base wire 31 becomes equal to or less than the parking-brake-deactivation completion reference value Flow, the electric parking brake control unit 60 stops the electric motor 21. Accordingly, after that point in time, the parking brakes 40L and 40R are in the deactivated state. The above is the outline of the manual deactivation control effected by the manual control function.

As described above, in the parking brake control effected by the manual control function, the electric parking brake control unit 60 determines whether the parking brake manual activation control or the parking brake manual deactivation control is to be started, and accordingly starts the parking brake manual activation control or the parking brake manual deactivation control. Further, the electric parking brake control unit 60 determines whether the parking brake manual activation control or the parking brake manual deactivation control is to be ended, and accordingly ends the parking brake manual activation control or the parking brake manual deactivation control.

Specifically, the parking brake control by the manual control function is executed by the electric parking brake control unit 60 only. Further, the parking brake control by the manual control function is performed in preference to the parking brake control by the automatic control function. For example, even during execution of the above-described automatic activation control, when the driver operates the deactivation switch 53, the manual deactivation control is started immediately. Similarly, even during execution of the above-described automatic deactivation control, when the driver operates the activation switch 52, the manual activation control is started immediately.

Moreover, as in the parking brake control by the automatic control function, the above-described manual deactivation control in the parking brake control by the manual control function is performed only when the ignition switch is "ON." In contrast, the above-described manual activation control is performed irrespective of whether the ignition switch is "ON" or "OFF."

<Outline of Switch System Anomaly Determination>

As described previously, the activation switch 52 and the deactivation switch 53 are not operated simultaneously. Therefore, if a signal indicative of operation of the activation switch 52 and a signal indicative of operation of the deactivation switch 53 are simultaneously input to the electric parking brake control unit 60, the electric parking brake control unit 60 determines that an anomaly (predetermined failure) has occurred in the switch system. As described above, the means for detecting generation of an anomaly in the switch system serves as failure detection means.

When the electric parking brake control unit 60 determines that an anomaly has occurred in the switch system, the electric parking brake control unit 60 sends a signal indicative of an anomaly code corresponding to generation of an anomaly in the switch system (signal corresponding to the details of a failure) to the brake hydraulic pressure control unit 90 via the signal line L2.

Upon receipt of a signal indicative of the anomaly code, the brake hydraulic pressure control unit 90 stores a value corresponding to the anomaly code in the backup RAM 94, which serves as the above-described storage device. By virtue of this operation, information regarding an anomaly in the switch system of the electric parking brake apparatus 10 can be output, as a diagnosis signal, to an external circuit (e.g., a diagnosis monitor or checker) via the dedicated diagnosis signal output port provided in the interface 95.

<Actual Operation>

Next, actual operations of the brake hydraulic pressure control system configured as described above and the electric parking brake apparatus 10 according to the present invention and configured as described above will be described with reference to FIGS. 2 to 5, which show, in the form of flowcharts, routines executed by the CPU 91 of the brake hydraulic pressure control unit 90, as well as with reference to FIGS. 6 to 9, which show, in the form of flowcharts, routines executed by the CPU 61 of the electric parking brake control unit 60. Notably, of the routines of FIGS. 2 to 9, only the routines of FIGS. 6 and 7, relating to manual activation control, are executed irrespective of whether the ignition switch is "ON" or "OFF"; however, the remaining routines are executed only when the ignition switch is "ON." First, there will be described a case in which automatic activation control is performed by the automatic control function. In this case, the activation switch 52 and the deactivation switch 53 are assumed not to be operated.

Figure 2:
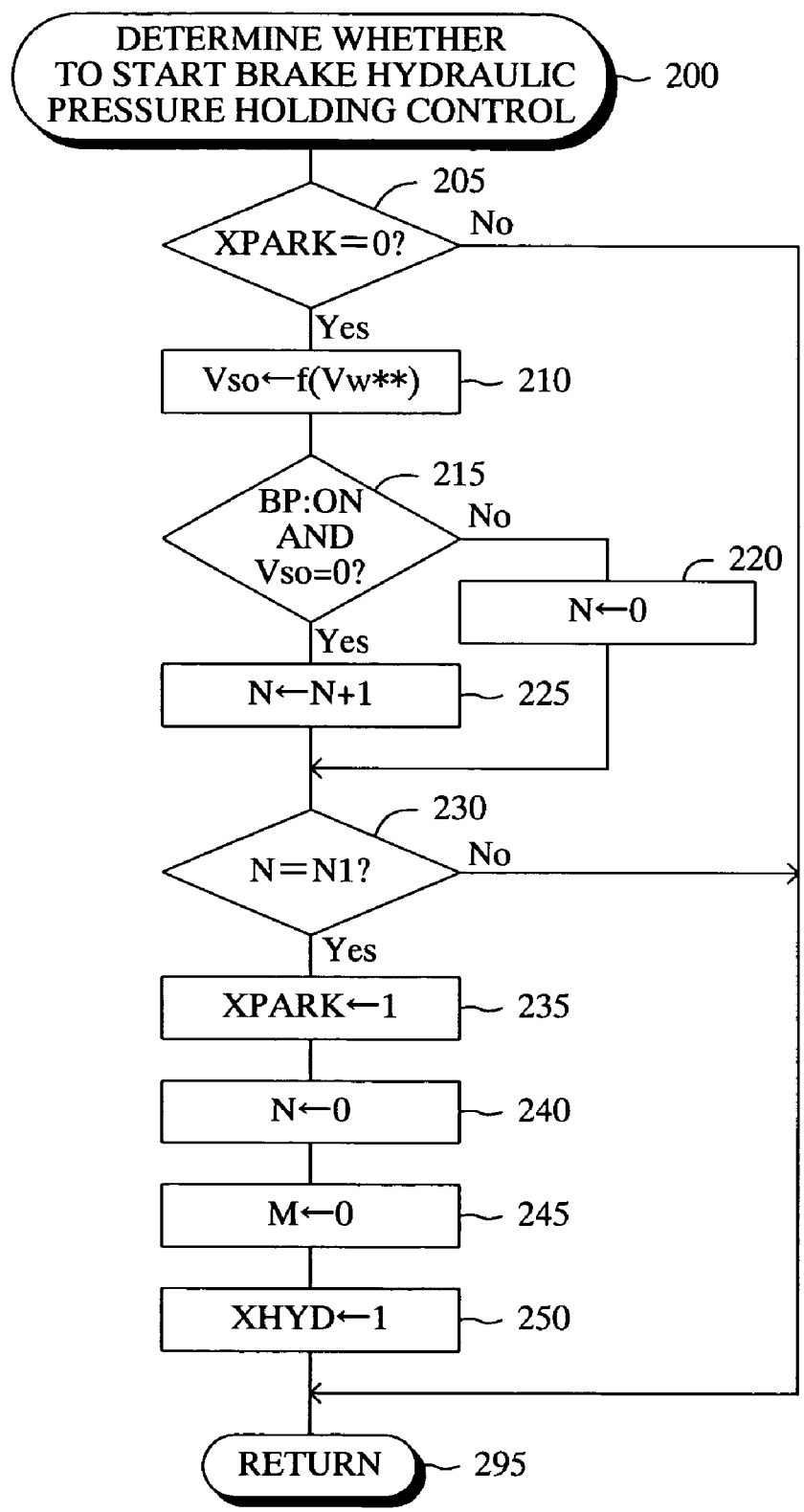
FIG. 2 is a flowchart showing a routine which a CPU91 of the brake hydraulic pressure control unit shown in FIG. 1 executes in order to determine whether to start brake hydraulic pressure holding control.

Automatic Activation Control by the Automatic Control Function:

At predetermined intervals, the CPU 91 of the brake hydraulic pressure control unit 90 repeatedly performs a routine shown in FIG. 2 and adapted to determine whether to start brake hydraulic pressure holding control. When a predetermined timing has been reached, the CPU 91 starts the processing from step 200, and proceeds to step 205 in order to determine whether the value of a flag XPARK, which indicates the lack of necessity for determining whether to start brake hydraulic pressure holding control, is "0." When the value of the flag XPARK is "1," this indicates that the present state does not require the above-described determination as to whether to start brake hydraulic pressure holding control. When the value of the flag XPARK is "0," this indicates that the present state requires the above-described determination as to whether to start brake hydraulic pressure holding control.

Here, the description will be continued under the assumption that the value of the flag XPARK is "0." The CPU 91 makes a "Yes" determination in step 205, and proceeds to step 210 in order to calculate an estimated vehicle body speed Vso of the vehicle on the basis of wheel speeds Vw of the respective wheels, detected by the wheel speed sensors 81**\*\*, and in accordance with the equation shown in the box of step 210 and corresponding to the right side of the above-described Equation 1.

Subsequently, the CPU 91 proceeds to step 215 in order to determine whether the estimated vehicle body speed Vso is zero and the brake pedal BP is operated. When the CPU 91 makes a "No" determination in step 215, the CPU 91 proceeds to step 220 in order to set the value of a counter N (hereinafter referred to as the "counter value N") to "0," and then proceeds to step 230.

In contrast, when the CPU 91 makes a "Yes" determination in step 215, the CPU 91 proceeds to step 225 in order to increment the counter value N by one, and then proceeds to step 230. The counter value N corresponds to a duration time up to the present over which the state in which the estimated vehicle body speed Vso is zero and the brake pedal BP is operated continues.

In step 230, the CPU 91 determines whether the counter value N is equal to a reference value N1 for determining whether to start the brake hydraulic pressure holding control, the reference value N1 corresponding to the above-described predetermined time T1. If the counter value N is smaller than the reference value N1, then the CPU 91 makes a "No" determination in step 230, and proceeds directly to step 295 so as to end the present routine.

Here, the description will be continued under the assumption that the state in which the estimated vehicle body speed Vso is zero and the brake pedal BP is operated has continued over the predetermined time T1 up to the present, and the counter value N has become equal to the reference value N1 (that is, the brake-hydraulic-pressure-holding-control start condition has been satisfied). In this case, the CPU 91 makes a "Yes" determination in step 230, and proceeds to step 235 in order to set the flag XPARK, which indicates the lack of necessity for determining whether to start brake hydraulic pressure holding control, to "1." The CPU 91 then clears the counter value N to zero in subsequent step 240, and clears the value of a counter M (hereinafter may be referred to as the "counter value M") to zero in subsequent step 245. Further, in subsequent step 250, the CPU 91 sets a flag XHYD, which indicates that counting of a hydraulic pressure holding time continues, to "1," and then proceeds to step 295 in order to end the present routine.

The counter M is used to count a hydraulic pressure holding duration time in the routine shown in FIG. 3, which will be described later. During the hydraulic pressure holding duration time, brake hydraulic pressure is maintained by the brake hydraulic pressure holding control. When the value of the flag XHYD is "1," this indicates current performance of counting for determining whether the above-described predetermined time T2 has elapsed after satisfaction of the brake-hydraulic-pressure-holding-control start condition. When the value of the flag XHYD is "0," this indicates nonperformance of counting for determining whether the above-described predetermined time T2 has elapsed after satisfaction of the brake-hydraulic-pressure-holding-control start condition.

After that point in time, the CPU 91 makes a "No" determination when proceeding to step 205, and proceeds directly to step 295, so that the determination as to whether to start brake hydraulic pressure holding control is not performed by the processing in step 215.

Figure 3:
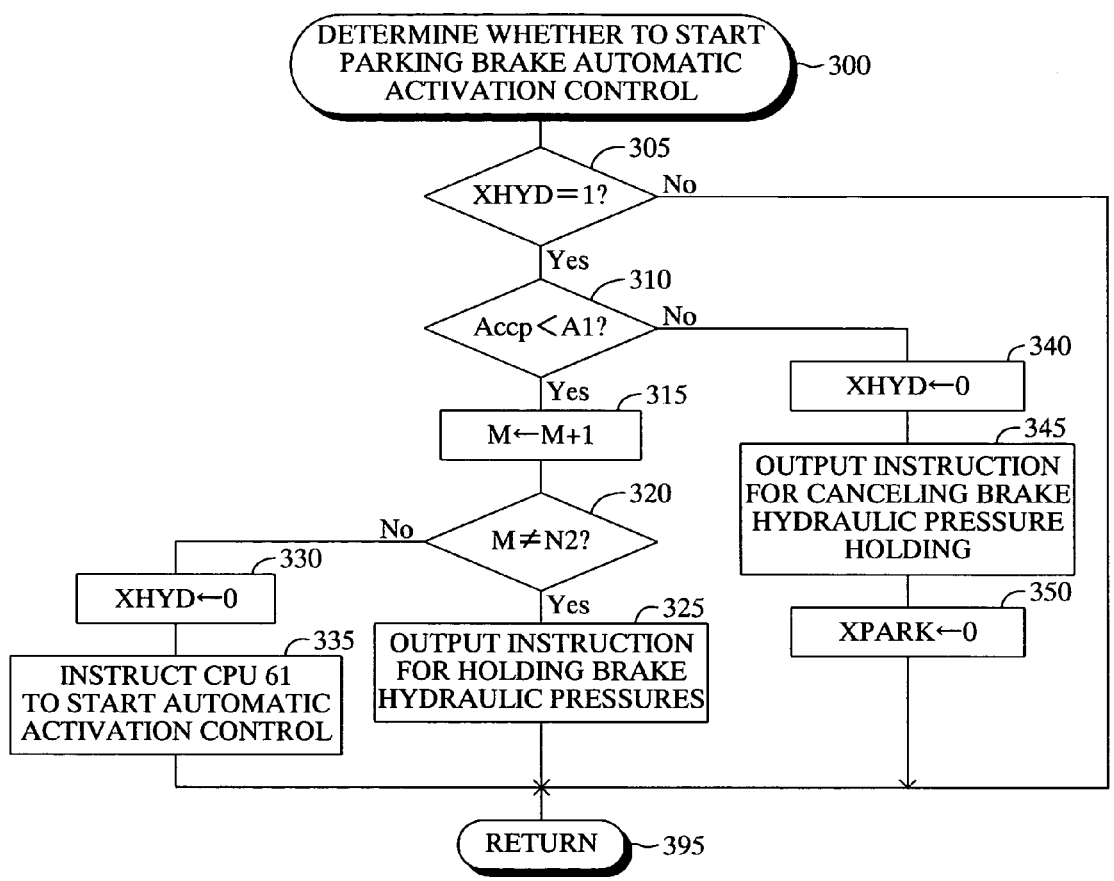
FIG. 3 is a flowchart showing a routine which the CPU91 of the brake hydraulic pressure control unit executes in order to determine whether to start parking-brake automatic activation control.

Further, at predetermined intervals the CPU 91 of the brake hydraulic pressure control unit 90 repeatedly performs a routine shown in FIG. 3 and adapted to determine whether to start parking brake automatic activation control. When a predetermined timing has been reached, the CPU 91 starts the processing from step 300, and proceeds to step 305 in order to determine whether the value of the flag XHYD, which indicates that counting of a hydraulic pressure holding time continues, is "1." If the value of the flag XHYD is "0," then the CPU 91 makes a "No" determination in step 305, and proceeds directly to step 395 so as to end the present routine.

Here, the description will be continued under the assumption that the present time is immediately after the flag XHYD is set to "1" as a result of execution of the above-described step 250 of FIG. 2, and the accelerator pedal AP is not operated by the driver. In this case, the CPU 91 makes a "Yes" determination in step 305, and proceeds to step 310 in order to determine whether the operation amount Accp of the accelerator pedal AP is smaller than the above-described predetermined value A1.

Since the accelerator pedal AP is not operated at the present time, the operation amount Accp of the accelerator pedal AP is smaller than the above-described predetermined value A1. Accordingly, the CPU 91 makes a "Yes" determination in step 310, and proceeds to step 315 in order to increment the counter value M (zero at the present) by one. Subsequently, the CPU 91 proceeds to step 320 in order to determine whether the count value M differs from a reference value N2 for determining whether to start parking brake automatic actuation, the reference value N2 corresponding to the above-described predetermined time T2.

At the present time, the counter value M is "1" and is smaller than the reference value N2. Therefore, the CPU 91 makes a "Yes" determination in step 320, and then proceeds to step 325 in order to instruct the brake hydraulic pressure controller 70 to hold the hydraulic pressures within the wheel cylinders W** of the respective wheels at the present levels. Subsequently, the CPU 91 proceeds to step 395 in order to end the present routine.

After that point in time, so long as the operation amount Accp of the accelerator pedal AP is smaller than the predetermined value A1, and the counter value M, which increases through repetition of the processing in step 315, is smaller than the reference value N2, the CPU 91 repeatedly executes the processing in steps 300, 305 ("Yes" determination), 310 ("Yes" determination), 315, 320 ("Yes" determination), 325, and 395, to thereby continuously hold the hydraulic pressures within the wheel cylinders W** of the respective wheels.

When the operation amount Accp of the accelerator pedal AP becomes equal to or greater than the predetermined value A1 (the driver operates the accelerator pedal AP) before the counter value M reaches the reference value N2, the CPU 91 makes a "No" determination when proceeding to step 310, and then proceeds to step 340 in order to set the value of the flag XHYD to "0." Further, in subsequent step 345, the CPU 91 instructs the brake hydraulic pressure controller 70 to cancel the holding of the hydraulic pressures within the wheel cylinders W** of the respective wheels, and after setting the value of the flag XPARK to "0" in step 350, the CPU 91 proceeds to step 395 to end the present routine. As a result, the CPU 91 makes a "No" determination when proceeding to step 305, and proceeds directly to step 395; and makes a "Yes" determination when proceeding to step 205 of the routine of FIG. 2, and again starts the determination as to whether to start the brake hydraulic pressure holding control, by executing the step 215.

Here, the predetermined time T2 is assumed to have elapsed after satisfaction of the brake hydraulic pressure-holding-control start condition (the parking-brake-automatic-activation-control start condition is assumed to have been satisfied), while the state in which the operation amount Accp of the accelerator pedal AP is smaller than the predetermined value A1 continues. In this case, the counter value M has reached the reference value N2, the CPU 91 makes a "No" determination when proceeding to step 320, and proceeds to step 330 in order to set the flag XHYD to "0." Subsequently, the CPU 91 proceeds to step 335 and instructs the CPU 61 of the electric parking brake control unit 60 to start the parking brake automatic activation control, and then proceeds to step 395 in order to end the present routine.

After that point in time, the CPU 91 makes a "No" determination when proceeding to step 305, and proceeds directly to step 395. Moreover, because the value of the flag XPARK is maintained at "1," the CPU 91 repeatedly makes a "No" determination when proceeding to step 205 of the routine of FIG. 2, so that the CPU 91 does not perform (resume) the determination in step 215 as to whether to start brake hydraulic pressure holding control. Further, the holding of the hydraulic pressures within the wheel cylinders W** of the respective wheels is continued.

Moreover, at predetermined intervals the CPU 91 of the brake hydraulic pressure control unit 90 repeatedly performs a routine shown in FIG. 4 and adapted to determine whether to start parking brake automatic deactivation control. When a predetermined timing has been reached, the CPU 91 starts the processing from step 400, and proceeds to step 405 in order to determine whether the value of the flag XPARK, which indicates the lack of necessity for determining whether to start brake hydraulic pressure holding control, is "1" and the value of the flag XHYD, which indicates the continuation of counting of a hydraulic pressure holding time, is "0.", When the CPU 91 makes a "No" determination, the CPU 91 proceeds directly to step 495 so as to end the present routine.

At the present time, the value of the flag XHYD is set to "0" because of execution of the above-described step 330, and the value of the flag XPARK is still maintained at "1." Therefore, the CPU 91 makes a "Yes" determination in step 405, and proceeds to step 410 in order to determine whether the operation amount Accp of the accelerator pedal AP is smaller than the above-described predetermined value A1.

When the operation amount Accp of the accelerator pedal AP is equal to or greater than the above-described predetermined value A1, the CPU 91 makes a "No" determination in step 410, and proceeds to step 415 in order to instruct the CPU 61 to start the parking brake automatic deactivation control. Subsequently, the CPU 91 proceeds to step 495 in order to end the present routine. This case will be described later.

Here, the state in which the operation amount Accp of the accelerator pedal AP is smaller than the predetermined value A1 (the accelerator pedal AP is not operated by the driver) is assumed to continue. In this case, the CPU 91 makes a "Yes" determination in step 410, and proceeds to step 495 in order to end the present routine. After that point in time, the CPU 91 repeatedly executes the processings in steps 400, 405 ("Yes" determination), 410 ("Yes" determination), and 495, so long as the value of the flag XHYD is maintained at "0," the value of the flag XPARK is maintained at "1," and the state in which the operation amount Accp of the accelerator pedal AP is smaller than the predetermined value A1 continues.

Moreover, at predetermined intervals the CPU 91 of the brake hydraulic pressure control unit 90 repeatedly performs a routine shown in FIG. 5 and adapted to determine whether to end brake hydraulic pressure holding control. When a predetermined timing has been reached, the CPU 91 starts the processing from step 500, and proceeds to step 505 in order to determine whether an instruction for canceling the holding of brake hydraulic pressures is output from the CPU 61. When the CPU 91 makes a "Yes" determination, the CPU 91 proceeds to step 510 in order to instruct the brake hydraulic pressure controller 70 to cancel the holding of the hydraulic pressures within the wheel cylinders W1 of the respective wheels. After setting the value of the flag XHYD to "0" in subsequent step 515, the CPU 91 proceeds to step 595 in order to end the present routine.

Although the instruction for canceling the brake hydraulic pressure holding is output from the CPU 61 in step 635 of FIG. 6 and in step 735 of FIG. 7, which will be described later, here, it is assumed that the CPU 61 does not output the instruction for canceling the brake hydraulic pressure holding. In this case, the CPU 91 makes a "No" determination in step 505, and proceeds to step 595 in order to end the present routine. After that point in time, the CPU 91 repeatedly executes the processings in steps 500, 505 ("No" determination), and 595, so long as the state in which the CPU 61 does not output the instruction for canceling the brake hydraulic pressure holding continues. In the above-described manner, the CPU 91 of the brake hydraulic pressure control unit 90 repeatedly executes the respective routines of FIGS. 2 to 5 at predetermined intervals.

Figure 6:
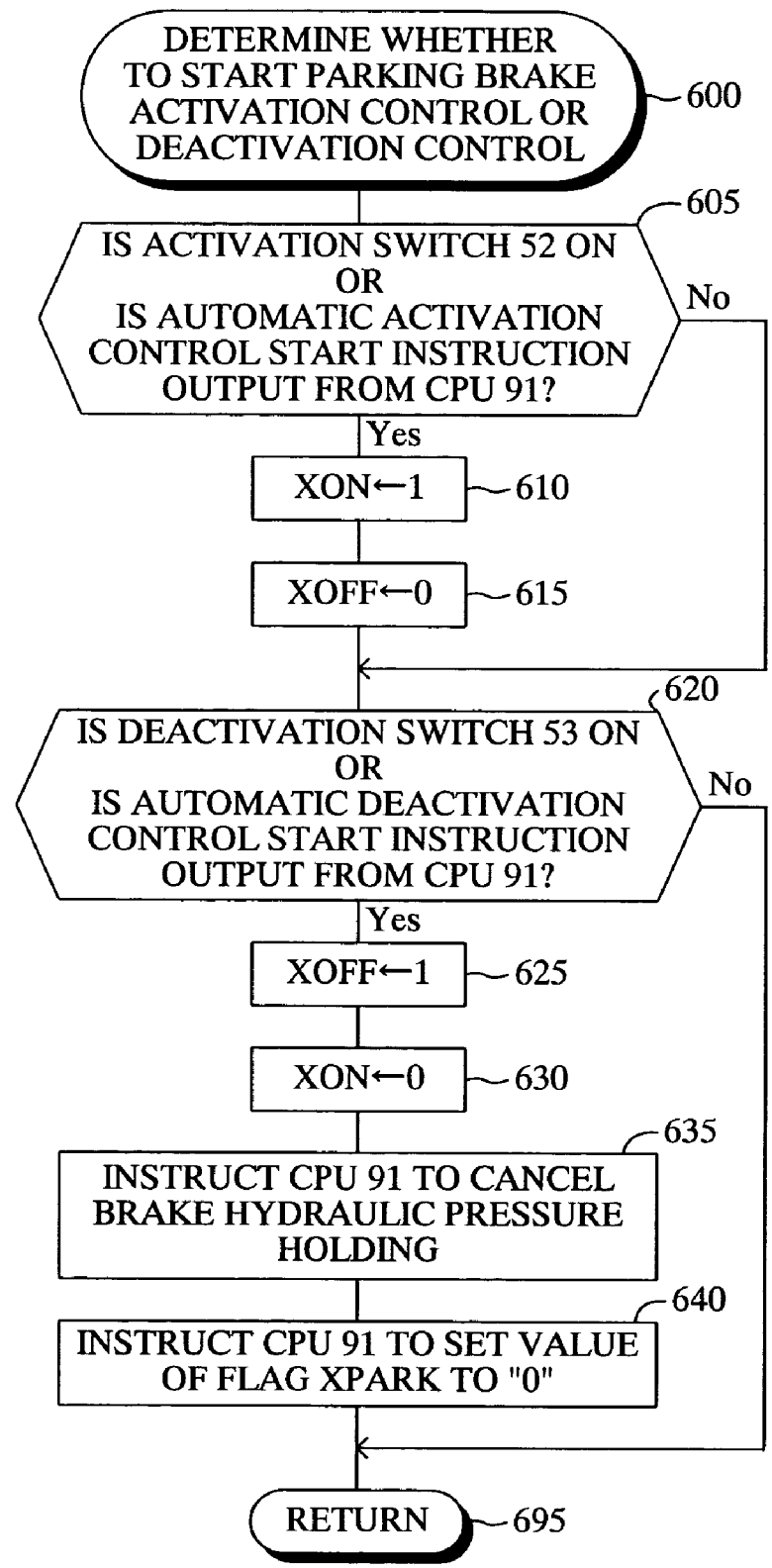
FIG. 6 is a flowchart showing a routine which a CPU61 of the electric parking brake control unit shown in FIG. 1 executes in order to determine whether to start parking-brake activation and deactivation controls.

Meanwhile, at predetermined intervals the CPU 61 of the electric parking brake control unit 60 repeatedly performs a routine shown in FIG. 6 and adapted to determine whether to start parking brake activation control or parking brake deactivation control. When a predetermined timing has been reached, the CPU 61 starts the processing from step 600, and proceeds to step 605 in order to determine whether the activation switch 52 is operated (i.e., is in an "ON" state) or a parking-brake-automatic-activation-control start instruction is output from the CPU 91.

Here, the present point in time is assumed to be immediately after the parking-brake-automatic-activation-control start instruction has been output from the CPU 91 by means of processing in step 335 of the previously described routine of FIG. 3 as a result of the parking-brake-automatic-activation-control start condition having been satisfied in step 320 of that routine. In this case, the CPU 61 makes a "Yes" determination in step 605, and then proceeds to step 610 in order to set to "1" the value of a flag XON, which indicates current performance of parking brake activation control. In subsequent step 615, the CPU 61 sets to "0" the value of a flag XOFF, which indicates current performance of parking brake deactivation control. Subsequently, the CPU 61 proceeds to step 620.

When the value of the flag XON is "1," this indicates that the above-described automatic activation control or the above-described manual activation control is currently performed; and when the value of the flag XON is "0," this indicates that neither the automatic activation control nor the manual activation control is currently performed. Further, when the value of the flag XOFF is "1," this indicates that the above-described automatic deactivation control or the above-described manual deactivation control is currently performed; and when the value of the flag XOFF is "0," this indicates that neither the automatic deactivation control nor the manual deactivation control is currently performed.

After having proceeded to step 620, the CPU 61 determines whether the deactivation switch 53 is operated (i.e., in an "ON" state) or a parking-brake-automatic-deactivation-control start instruction is output from the CPU 91. As described above, the present point in time is immediately after the parking-brake-automatic-activation-control start instruction has been output from the CPU 91, and the deactivation switch 53 is not operated. Therefore, the CPU 61 makes a "No" determination in step 620, and proceeds directly to step 695 in order to end the present routine.

After that point in time, the CPU 61 repeatedly executes the processings in steps 600, 605 ("No" determination), 620 ("No" determination), and 695, so long as neither the activation switch 52 nor the deactivation switch 53 is operated, and the automatic-deactivation-control start instruction is not output from the CPU 91 by means of the processing in step 415 of FIG. 4.

Figure 7:
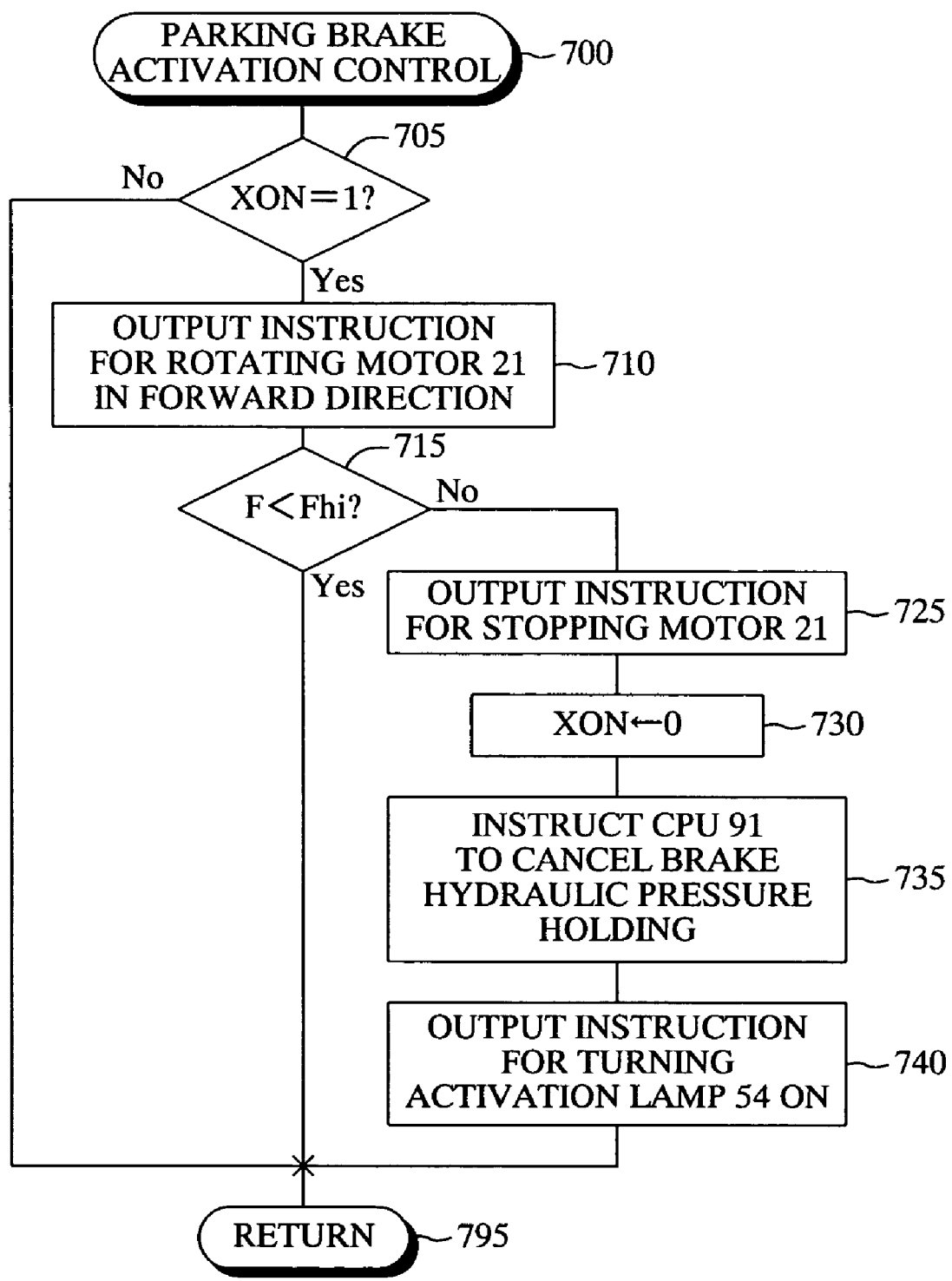
FIG. 7 is a flowchart showing a routine which the CPU61 of the electric parking brake control unit executes in order to perform parking-brake activation control.

Further, at predetermined intervals the CPU 61 of the electric parking brake control unit 60 repeatedly performs a routine shown in FIG. 7 and adapted to perform parking brake activation control. When a predetermined timing has been reached, the CPU 61 starts the processing from step 700, and proceeds to step 705 in order to determine whether the value of the flag XON, which indicates current performance of parking brake activation control, is "1." When the CPU 61 makes a "No" determination, the CPU 61 proceeds directly to step 795 in order to end the present routine.

Here, the value of the flag XON is assumed to have been set to "1" as a result of execution of the above-described step 610 of FIG. 6. In this case, the CPU 61 makes a "Yes" determination in step 705, and then proceeds to step 710. In step 710, the CPU 61 instructs an unillustrated drive circuit for the electric motor 21 to rotate the motor 21 in the forward direction with a predetermined electrical power. As a result, the electric motor 21 is rotated in the forward direction with the predetermined electrical power, whereby the braking forces of the parking brakes 40L and 40R start to increase.

Next, the CPU 61 proceeds to step 715 in order to determine whether the tension F of the base wire 31 is less than the above-described parking-brake-activation completion reference value Fhi. Since the present point in time is immediately after the forward rotation of the electric motor 21 has started, the tension F of the base wire 31 is less than the parking-brake-activation completion reference value Fhi. Therefore, the CPU 61 makes a "Yes" determination in step 715, and then proceeds directly to step 795 in order to end the present routine.

After that point in time, the CPU 61 repeatedly executes the processings in steps 700, 705 ("Yes" determination), 710, 715 ("Yes" determination), and 795, so long as the tension F of the base wire 31, which increases because of the forward rotation of the electric motor 21, is less than the parking-brake-activation completion reference value Fhi.

When the tension F of the base wire 31 reaches the parking-brake-activation completion reference value Fhi after elapse of a predetermined time, the CPU 61 makes a "No" determination when proceeding to step 715, and then proceeds to step 725. In step 725, the CPU 61 instructs the unillustrated drive circuit for the electric motor 21 to stop the drive of the motor 21. As a result, the electric motor 21 is stopped, and the parking brakes 40L and 40R enter the activated state.

Next, the CPU 61 proceeds to step 730 in order to set the value of the flag XON to "0." In subsequent step 735, the CPU 61 outputs to the CPU 91 an instruction for canceling the brake hydraulic pressure holding. Further, in subsequent step 740, the CPU 61 instructs an unillustrated drive circuit for the activation lamp 54 to turn the activation lamp 54 on, and then the CPU 61 proceeds to step 795 so as to end the present routine. As a result, the activation lamp 54 is turned on. The "ON" state of the activation lamp 54 indicates that the parking brakes 40L and 40R are in the activated state. After this point in time, the CPU 61 makes a "No" determination in step 705, and proceeds directly to step 795 so as to end the present routine.

At that time, the CPU 91 of the brake hydraulic pressure control unit 90 receives the instruction for canceling the brake hydraulic pressure holding that has been output from the CPU 61 by means of the processing in step 735, makes a "Yes" determination when proceeding to the previously-described step 505 of FIG. 5, and proceeds to step 510 in order to instruct the brake hydraulic pressure controller 70 to cancel the holding of the hydraulic pressures within the wheel cylinders W of the respective wheels. After setting the value of the flag XHYD, which indicates the continuation of counting of a hydraulic pressure holding time, to "0" in subsequent step 515 (at the present point in time, the value of the flag XHYD has already been set to "0" by the previously described processing in step 330 of FIG. 3), the CPU 91 proceeds to step 595 in order to end the present routine. By virtue of the above-described operation, the hydraulic pressures within the wheel cylinders W of the respective wheels are relieved. In this manner, automatic activation control is performed by the automatic control function. Next, there will be described a case in which automatic deactivation control is performed by the automatic control function.

Automatic Deactivation Control by the Automatic Control Function:

As having been described in the previous description regarding the processing in step 405 of the routine of FIG. 4, at the present point in time, the value of the flag XHYD, which indicates the continuation of counting of a hydraulic pressure holding time, is maintained at "0," and the value of the flag XPARK, which indicates the lack of necessary of determining whether to start brake hydraulic pressure holding control, is still maintained at "1." Therefore, the CPU 91 of the brake hydraulic pressure control unit 90 repeats the operation of making a "Yes" determination in step 405, and proceeding to step 410 in order to determine whether the operation amount Accp of the accelerator pedal AP is smaller than the above-described predetermined value A1.

Here, there is assumed a state in which, because of the driver's operation of the accelerator pedal AP, the operation amount Accp of the accelerator pedal AP has become equal to or greater than the above-described predetermined value A1 (that is, the parking-brake-automatic-deactivation-control start condition is satisfied). In this case, the CPU 91 makes a "No" determination in step 410, and proceeds to step 415 in order to instruct the CPU 61 to start the parking brake automatic deactivation control. Subsequently, the CPU 91 proceeds to step 495 in order to end the present routine.

Meanwhile, as described previously, the CPU 61 is repeatedly executing the processings in steps 600, 605 ("No" determination), 620 ("No" determination), and 695 of FIG. 6. When a parking-brake-automatic-deactivation-control start instruction is output from the CPU 91 by means of the processing in step 415 of FIG. 4, the CPU 61 makes a "Yes" determination when proceeding to step 620 of FIG. 6, and then proceeds to step 625.

In step 625, the CPU 61 sets to "1" the value of the flag XOFF, which indicates current performance of parking brake deactivation control, and in subsequent step 630, the CPU 61 sets to "0" the value of the flag XON, which indicates current performance of parking brake activation control. Subsequently, the CPU 61 proceeds to step 635 in order to instruct the CPU 91 to cancel the holding of brake hydraulic pressures, and in subsequent step 640, the CPU 61 instructs the CPU 91 to set the value of the flag XPARK to "0." Subsequently, the CPU 61 proceeds to step 695 in order to end the routine of FIG. 6.

By virtue of the above-described operation, in the case where the brake hydraulic pressures within the wheel cylinders Wfl, Wfr, Wrl, and Wrr of the respective wheels are held at that time, the held brake hydraulic pressures are relieved (at the present point in time, the brake hydraulic pressures have already been relieved by means of the previously-described processing in step 735 of FIG. 7). Moreover, upon receipt of the instruction output from the CPU 61 and instructing to set the value of the flag XPARK to "0," the CPU 91 sets the value of the flag XPARK to "0." As a result, the CPU 91 of the brake hydraulic pressure control unit 90 makes a "No" determination when proceeding to step 405 of the routine of FIG. 4, and proceeds directly to step 495. Further, the CPU 91 makes a "Yes" determination when proceeding to step 205 of the routine of FIG. 2, and again starts the determination as to whether to start the brake hydraulic pressure holding control, through execution of step 215.

Figure 8:
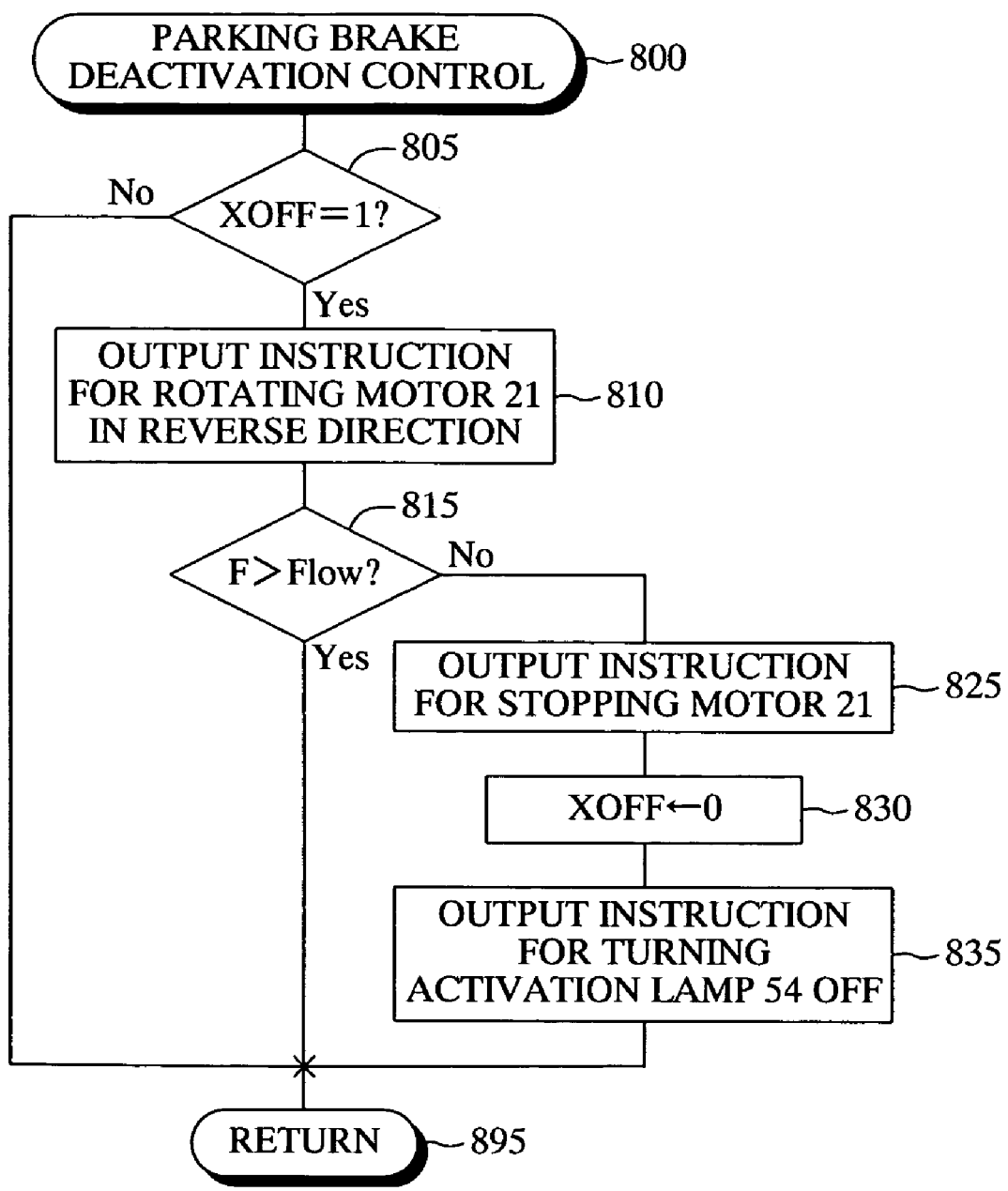
FIG. 8 is a flowchart showing a routine which the CPU61 of the electric parking brake control unit executes in order to perform parking-brake deactivation control.

Furthermore, at predetermined intervals the CPU 61 of the electric parking brake control unit 60 repeatedly performs a routine shown in FIG. 8 and adapted to perform parking brake deactivation control. When a predetermined timing has been reached, the CPU 61 starts the processing from step 800, and proceeds to step 805 in order to determine whether the value of the flag XOFF, which indicates current performance of parking brake deactivation control, is "1." When the CPU 61 makes a "No" determination, the CPU 61 proceeds directly to step 895 in order to end the present routine.

Here, the value of the flag XOFF is assumed to have been set to "1" as a result of execution of the above-described step 625 of FIG. 6. In this case, the CPU 61 makes a "Yes" determination in step 805, and then proceeds to step 810. In step 810, the CPU 61 instructs the unillustrated drive circuit for the electric motor 21 to rotate the motor 21 in the reverse direction with a predetermined electrical power. As a result, the electric motor 21 is rotated in the reverse direction with the predetermined electrical power, whereby the braking forces of the parking brakes 40L and 40R start to decrease.

Next, the CPU 61 proceeds to step 815 in order to determine whether the tension F of the base wire 31 is greater than the above-described parking-brake-deactivation completion reference value Flow. Since the present point in time is immediately after the reverse rotation of the electric motor 21 has started, the tension F of the base wire 31 is greater than the parking-brake-deactivation completion reference value Flow. Therefore, the CPU 61 makes a "Yes" determination in step 815, and then proceeds directly to step 895 in order to end the present routine.

After that point in time, the CPU 61 repeatedly executes the processings in steps 800, 805 ("Yes" determination), 810, 815 ("Yes" determination), and 895, so long as the tension F of the base wire 31, which decreases because of the reverse rotation of the electric motor 21, is greater than the parking-brake-deactivation completion reference value Flow.

When the tension F of the base wire 31 reaches the parking-brake-deactivation completion reference value Flow after elapse of a predetermined time, the CPU 61 makes a "No" determination when proceeding to step 815, and then proceeds to step 825. In step 825, the CPU 61 instructs the unillustrated drive circuit for the electric motor 21 to stop the drive of the motor 21. As a result, the electric motor 21 is stopped, and the parking brakes 40L and 40R enter the deactivated state.

Subsequently, the CPU 61 proceeds to step 830 in order to set the value of the flag XOFF to "0," and in subsequent step 835, the CPU 61 instructs the unillustrated drive circuit for the activation lamp 54 to turn the activation lamp 54 off. Subsequently, the CPU 61 proceeds to step 895 so as to end the present routine. As a result, the activation lamp 54 is turned off. The "OFF" state of the activation lamp 54 indicates that the parking brakes 40L and 40R are in the deactivated state. After this point in time, the CPU 61 makes a "No" determination in step 805, and proceeds directly to step 895 so as to end the present routine. In this manner, automatic deactivation control is performed by the automatic control function. Next, there will be described a case in which manual activation control is performed by the manual control function.

Manual Activation Control by the Manual Control Function:

As previously described, the CPU 61 of the electric parking brake control unit 60 repeatedly executes the routine of FIG. 6 at predetermined time intervals. Accordingly, irrespective of whether the above-described automatic activation control or automatic deactivation control is currently performed, when the activation switch 52 is operated (the parking-brake-manual-activation-control start condition is satisfied), the CPU 61 makes a "Yes" determination when proceeding to step 605, and then proceeds to step 610 in order to set to "1" the value of the flag XON, which indicates current performance of parking brake activation control. Further, in subsequent step 615, the CPU 61 sets to "0" the value of the flag XOFF, which indicates current performance of parking brake deactivation control.

As a result, the CPU 61 makes a "No" determination when proceeding to step 805 of FIG. 8, and then proceeds directly to step 895. Therefore, the parking brake deactivation control is not performed. Meanwhile, the CPU 61 makes a "Yes" determination when proceeding to step 705 of FIG. 7, and then proceeds to step 710 and subsequent steps. As a result, the above-described parking brake activation control is started, whereby the parking brakes 40L and 40R enter the activated state, and the activation lamp 54 is turned on. In this manner, the manual activation control by the manual control function is performed in preference to the parking brake control by the automatic control function.

Manual Deactivation Control by the Manual Control Function:

Irrespective of whether the above-described automatic activation control or automatic deactivation control is currently performed, when the deactivation switch 53 is operated (the parking-brake-manual-deactivation-control start condition is satisfied), the CPU 61 of the electric parking brake control unit 60 makes a "Yes" determination when proceeding to step 620, and then proceeds to step 625 in order to set to "1" the value of the flag XOFF, which indicates current performance of parking brake deactivation control. Further, in subsequent step 630, the CPU 61 sets to "0" the value of the flag XON, which indicates current performance of parking brake activation control, and in subsequent step 635, the CPU 61 instructs the CPU 91 to cancel the holding of brake hydraulic pressures. Moreover, in subsequent step 640, the CPU 61 instructs the CPU 91 to set to "0" the value of the flag XPARK, which indicates lack of necessity for determining whether to start brake hydraulic pressure holding control.

As a result, the CPU 61 makes a "No" determination in step 705 of FIG. 7 without fail, and proceeds directly to step 795. Therefore, the parking brake activation control is not performed. Meanwhile, the CPU 61 makes a "Yes" determination in step 805 of FIG. 8, and then proceeds to step 810 and subsequent steps. As a result, the above-described parking brake deactivation control is started, whereby the parking brakes 40L and 40R enter the deactivated state, and the activation lamp 54 is turned off.

Moreover, upon receipt of the instruction for canceling the holding of brake hydraulic pressures, which instruction is output from the CPU 61 by means of the processing in step 635, the CPU 91 of the brake hydraulic pressure control unit 90 makes a "Yes" determination when proceeding to step 505, and proceeds to step 510 and then to step 515. Further, upon reception of the instruction for setting the value of the flag XPARK to "0," which instruction is output from the CPU 61 by means of the processing in step 640, the CPU 91 sets the value of the flag XPARK to "0." As a result, in the case where the hydraulic pressures within the wheel cylinders W** of the respective wheels have been held by the above-described brake-hydraulic-pressure holding control, the held hydraulic pressures are relieved, and both the value of the flag XHYD and the value of the flag XPARK are assured of becoming "0." In this manner, the manual deactivation control by the manual control function is performed in preference to the parking brake control by the automatic control function.

Figure 9:
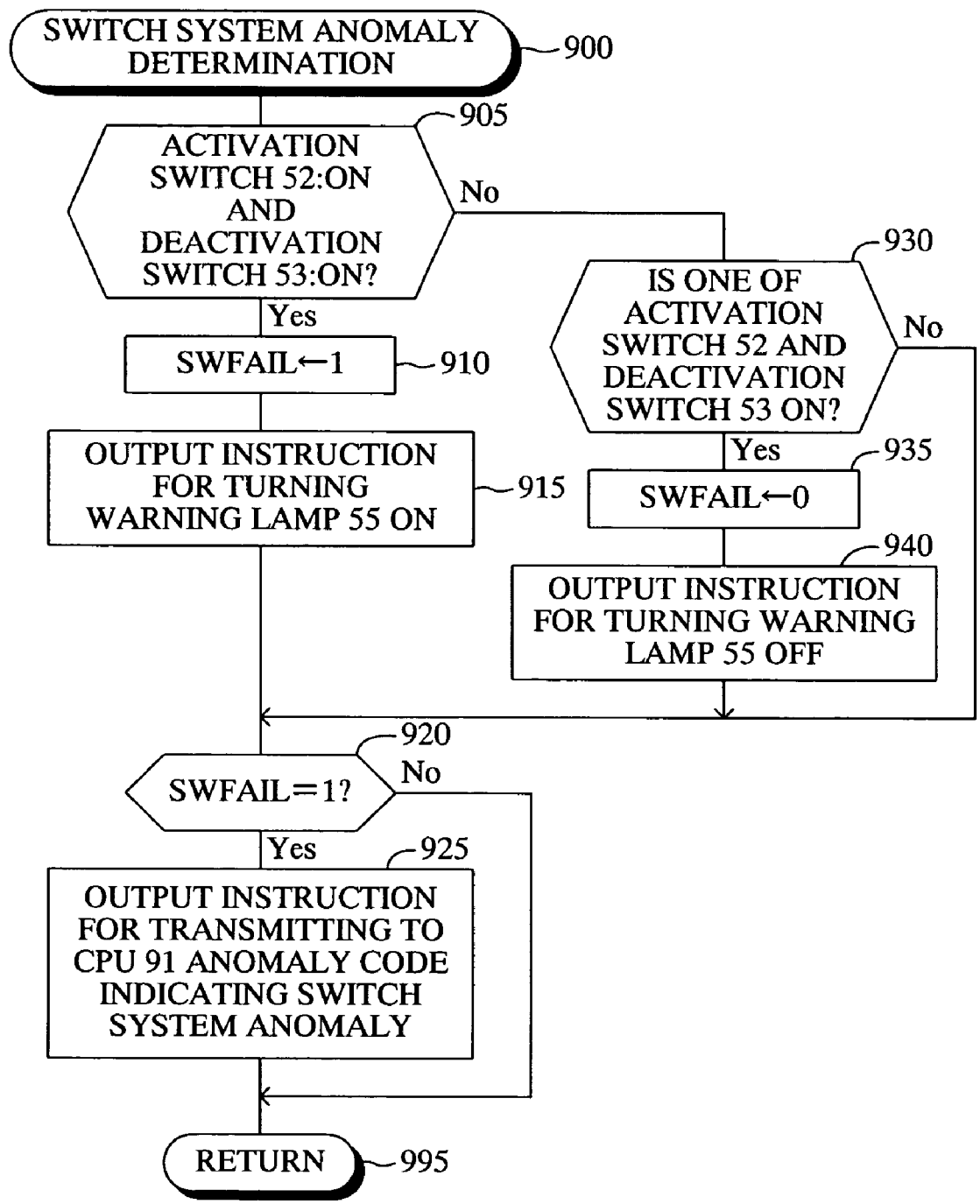
FIG. 9 is a flowchart showing a routine which the CPU61 of the electric parking brake control unit executes in order to determine occurrence of an anomaly in a switch system of the electric parking brake apparatus.

Switch System Anomaly Determination:

At predetermined intervals the CPU 61 of the electric parking brake control unit 60 repeatedly performs a routine shown in FIG. 9 and adapted to determine occurrence of an anomaly in the switch system. When a predetermined timing has been reached, the CPU 61 starts the processing from step 900, and proceeds to step 905 in order to determine whether the activation switch 52 and the deactivation switch 53 are operated simultaneously (whether both the activation switch 52 and the deactivation switch 53 are "ON").

As previously described, the activation switch 52 and the deactivation switch 53 are never operated simultaneously.

Accordingly, in an assumed state in which a signal indicative of operation of the activation switch 52 and a signal indicative of operation of the deactivation switch 53 are input simultaneously, an anomaly occurs in the switch system. In this case, the CPU 61 makes a "Yes" determination in step 905, and proceeds to step 910 so as to set the value of a switch-system anomaly flag SWFAIL to "1." Further, in subsequent step 915, the CPU 61 instructs an unillustrated drive circuit for the warning lamp 55 to turn the warning lamp 55 on. As a result, the warning lamp 55 is turned on.

Here, the switch-system anomaly flag SWFAIL indicates occurrence of an anomaly in the switch system when its value is "1" and indicates absence of an anomaly in the switch system when its value is "0." The "ON" state of the warning lamp 55 indicates occurrence of an anomaly in the switch system, and the "OFF" state of the warning lamp 55 indicates absence of an anomaly in the switch system.

Subsequently, the CPU 61 proceeds to step 920 in order to determine whether the value of the switch-system anomaly flag SWFAIL is "1." Since the value of the switch-system anomaly flag SWFAIL is "1" at the present point in time, the CPU 61 makes a "Yes" determination in step 920, and proceeds to step 925 in order to instruct transmission, to the CPU 91 of the brake hydraulic pressure control unit 90, of an anomaly code indicative of an anomaly of the switch system. Subsequently, the CPU 61 proceeds to step 995 in order to end the present routine.

After that point in time, the CPU 61 repeatedly executes the processings in steps 900, 905 ("Yes" determination), 910–920 ("Yes" determination), 925, and 995, so long as the state of simultaneous input of the signal indicative of operation of the activation switch 52 and the signal indicative of operation of the deactivation switch 53 continues.

Meanwhile, in an assumed case where the signal indicative of operation of the activation switch 52 and the signal indicative of operation of the deactivation switch 53 are not input simultaneously, the CPU 61 makes a "No" determination in step 905, and proceeds to step 930. In step 930, the CPU 61 determines whether only one of the signal indicative of operation of the activation switch 52 and the signal indicative of operation of the deactivation switch 53 is input.

Here, there is assumed the restoration of the state in which only one of the signal indicative of operation of the activation switch 52 and the signal indicative of operation of the deactivation switch 53 is input. In this case, the switch system is considered to have been restored to a normal state. Therefore, the CPU 61 makes a "Yes" determination in step 930, and proceeds to step 935 in order to set the value of the switch-system anomaly flag SWFAIL to "0." Further, in subsequent step 940, the CPU 61 instructs the unillustrated drive circuit for the warning lamp 55 to turn the warning lamp 55 off, and then proceeds to step 920. As a result, the warning lamp 55 is turned off. Moreover, in this case, the CPU 61 makes a "No" determination when proceeding to step 920, and proceeds directly to step 995 without performance of the processing in step 925.

When the determination in step 930 reveals that neither the signal indicative of operation of the activation switch 52 nor the signal indicative of operation of the deactivation switch 53 is input, the CPU 61 makes a "No" determination when proceeding to step 930, and proceeds to step 920. Accordingly, in this case, the value of the switch-system anomaly flag SWFAIL is not changed, and the switch-system anomaly flag SWFAIL is maintained at the value at that point in time. As a result, when the switch-system anomaly flag SWFAIL is maintained at "1," the processing of step 925 is performed, and when the switch-system anomaly flag SWFAIL is maintained at "0," the processing of step 925 is not performed.

In the above-described manner, once the signal indicative of operation of the activation switch 52 and the signal indicative of operation of the deactivation switch 53 are input simultaneously, the warning lamp 55 remains in the ON state, and the brake hydraulic pressure control unit 90 repeatedly stores a value corresponding to the above-described anomaly code into the backup RAM 94, serving as the storage device, until the state in which only one of the signal indicative of operation of the activation switch 52 and the signal indicative of operation of the deactivation switch 53 is input is restored. Moreover, once only one of the signal indicative of operation of the activation switch 52 and the signal indicative of operation of the deactivation switch 53 is input after that point in time, the warning lamp 55 remains in the OFF state, and instruction of transmission of an anomaly code from the CPU 61 to the CPU 91 is not executed, so long as the signal indicative of operation of the activation switch 52 and the signal indicative of operation of the deactivation switch 53 are not input simultaneously after that point in time.

In this manner, information regarding an anomaly of the switch system of the electric parking brake apparatus 10 is stored in time series in the backup RAM 94 of the brake hydraulic pressure control unit 90. Subsequently, that information is output, as a diagnosis signal, to an external circuit (e.g., a diagnosis monitor or checker) via the dedicated diagnosis signal output port provided in the interface 95.

As described above, in the electric parking brake apparatus according to the present invention, the electric parking brake control unit 60 does not include the above-described complicated determination function and various input circuits for receiving signals from various sensors, which are necessary for accomplishing the automatic control function. Therefore, the electric parking brake control unit 60 can be reduced in size, and the configuration of the electric parking brake control unit 60 can be simplified. Moreover, the electric parking brake control unit 60 can be used in a vehicle which requires both the automatic control function and the manual control function, by connecting the electric parking brake control unit 60 to the brake hydraulic pressure control unit 90 having the substantial automatic control function, via the signal line L1.

Moreover, the electric parking brake apparatus is configured in such a manner that when the brake-hydraulic-pressure-holding-control start condition, serving as a parking-brake-automatic-activation start condition, is satisfied, the hydraulic braking forces acting on the respective wheels at the time of satisfaction of that condition are first maintained for a predetermined time T2, and after elapse of the predetermined time T2, the parking brake automatic activation control is started. Accordingly, in the case where the parking-brake-automatic-deactivation start condition is satisfied (the driver operates the accelerator pedal AP) before elapse of the predetermined time T2, the brake hydraulic pressures are immediately released in order to allow the driver to start the vehicle smoothly. Further, since unnecessary activation of the parking brakes 40L and 40R is prevented, the durability of the electric motor 21 is improved. Furthermore, when the driver releases the brake pedal BP immediately after satisfaction of the brake-hydraulic-pressure-holding-control start condition, braking forces generated by means of brake hydraulic pressures are applied to the respective wheels immediately after satisfaction of the condition, whereby the vehicle can be reliably stopped and held in a stopped state.

Moreover, the electric parking brake control unit 60 is connected to the brake hydraulic pressure control unit 90 via the signal line L2 so as to store in the backup RAM 94 of the brake hydraulic pressure control unit 90 an anomaly code corresponding to an anomaly having occurred in the switch system of the electric parking brake apparatus 10. Therefore, diagnosis of a failure in relation to the electric parking brake apparatus 10 can be performed through utilization of the diagnosis signal output port provided in the brake hydraulic pressure control unit 90. As a result, the electric parking brake control unit 60 is not required to include a storage device corresponding to the backup RAM 94 and a dedicated diagnosis signal output port, etc. Accordingly, the electric parking brake control unit 60 can be further reduced in size and further simplified in configuration.

The present invention is not limited to the above-described embodiment and may be practiced in various modified forms without departing from the scope of the invention.

In the above-described embodiment, the electric parking brake apparatus is configured in such a manner that when the brake-hydraulic-pressure-holding-control start condition, serving as a parking-brake-automatic-activation start condition, is satisfied, the hydraulic braking forces acting on the respective wheels at the time of satisfaction of that condition are first maintained for the predetermined time T2, and after elapse of the predetermined time T2, the parking brake automatic activation control is started. However, the electric parking brake apparatus may be configured in such a manner that when the brake-hydraulic-pressure-holding-control start condition is satisfied, the parking-brake-automatic-activation start condition is considered to be satisfied, and the parking brake automatic activation control is immediately started.

In the above-described embodiment, the brake hydraulic pressures held by means of the brake hydraulic pressure holding control are relieved when the parking brakes 40L and 40R enter the activated state. However, the brake hydraulic pressures held by means of the brake hydraulic pressure holding control may be relieved unconditionally when a predetermined period of time elapses after satisfaction of the parking-brake-automatic-activation start condition.

In the above-described embodiment, the electric parking brake apparatus 10 is applied to a vehicle which requires both the automatic control function and the manual control function, and therefore, the electric parking brake control unit 60 is connected to the brake hydraulic pressure control unit 90 via the signal lines L1 and L2. However, when the electric parking brake apparatus 10 is applied to a vehicle which does not require the automatic control function and requires only the manual control function, the electric parking brake control unit 60 may be used without connection of the signal line L1 thereto. Further, in the case where a signal corresponding to the details of a failure of the electric parking brake apparatus 10 is not required to be output to the brake hydraulic pressure control unit 90, the electric parking brake control unit 60 may be used independently of the brake hydraulic pressure control unit 90 without connection of the signal lines L1 and L2 thereto.

What is claimed is:

1. An electric parking brake apparatus comprising:
   a parking brake of a vehicle, the parking brake being of the type which does not utilize fluid pressure for generating parking brake force;
   an electric driver for activating and deactivating the parking brake;
   manually operated member for generating activation and deactivation signals which instruct activation and deactivation of the parking brake, respectively; and
   an electric parking brake control unit for controlling the electric drive means on the basis of the signals,
   the electric parking brake control unit including an input section for receiving signals output from a second control unit mounted on the vehicle and instructing automatic activation and automatic deactivation of the parking brake, wherein the parking brake can be automatically activated and deactivated in the absence of the generation of activation and deactivation signals, respectively, by the manually operated member;
   wherein the second control unit is a brake hydraulic pressure control unit adapted to control hydraulic braking force applied to respective wheels of the vehicle, independently of operation of a brake pedal;
   the brake hydraulic pressure control unit is configured in such a manner that when a predetermined parking-brake-automatic-activation start condition is satisfied, the brake hydraulic pressure control unit maintains, for a predetermined period of time, a state in which a predetermined hydraulic braking force for stopping the vehicle and holding the vehicle in a stopped state is applied to the respective wheels independently of operation of the brake pedal, and outputs a signal for instructing automatic activation of the parking brake after elapse of the predetermined period of time; and
   the input section of the electric parking brake control unit is connected to the brake hydraulic pressure control unit to receive the signal output from the brake hydraulic pressure control unit and instruct automatic activation of the parking brake.

2. An electric parking brake apparatus according to claim 1, wherein the brake hydraulic pressure control unit is configured to relieve the respective wheels of the predetermined hydraulic braking force after the parking brake enters the activated state.

3. An electric parking brake apparatus according to claim 1, wherein the electric parking brake control unit comprises failure detection means for detecting generation of a predetermined failure in the electric parking brake apparatus and identifying details of the failure, and is connected to the second control unit to output to the second control unit a signal corresponding to the details of the failure.

4. An electric parking brake apparatus according to claim 3, wherein the second control unit includes an onboard diagnosis function for diagnosing the details of the failure relating to the electric parking brake apparatus.

5. An electric parking brake apparatus according to claim 2, wherein the electric parking brake control unit comprises failure detection means for detecting generation of a predetermined failure in the electric parking brake apparatus and identifying details of the failure, and is connected to the second control unit to output to the second control unit a signal corresponding to the details of the failure.

6. An electric parking brake apparatus according to claim 5, wherein the second control unit includes an onboard diagnosis function for diagnosing the details of the failure relating to the electric parking brake apparatus.

7. An electric parking brake apparatus comprising:
   a parking brake of a vehicle, the parking brake being of the type which does not utilize fluid pressure for generating parking brake force;

an electric driver for activating and deactivating the parking brake;

manually operated member for generating activation and deactivation signals which instruct activation and deactivation of the parking brake, respectively; and an electric parking brake control unit for controlling the electric drive means on the basis of the signals, the electric parking brake control unit including an input section for receiving signals output from a second control unit mounted on the vehicle and instructing automatic activation and automatic deactivation of the parking brake, wherein the parking brake can be automatically activated and deactivated in the absence of the generation of activation and deactivation signals, respectively, by the manually operated member;

wherein the parking brake is of the type which utilizes tension of a wire for generating the parking brake force, and the electric drive means is a motor for adjusting the tension of the wire; and wherein the second control unit is a brake hydraulic pressure control unit adapted to control hydraulic braking force applied to respective wheels of the vehicle, independently of operation of a brake pedal;

the brake hydraulic pressure control unit is configured in a such a manner that when a predetermined parking-brake-automatic-activation start condition is satisfied, the brake hydraulic pressure control unit maintains, for a predetermined period of time, a state in which a predetermined hydraulic braking force for stopping the vehicle and holding the vehicle in a stopped state is applied to the respective wheels independently of operation of the brake pedal, and outputs a signal for instructing automatic activation of the parking brake after elapse of the predetermined period of time; and the input section of the electric parking brake control unit is connected to the brake hydraulic pressure control unit to receive the signal output from the brake hydraulic pressure control unit and instruct automatic activation of the parking brake.

8. An electric parking brake apparatus according to claim 7, wherein the brake hydraulic pressure control unit is configured to relieve the respective wheels of the predetermined hydraulic braking force after the parking brake enters the activated state.

9. An electric parking brake apparatus according to claim 7, wherein the electric parking brake control unit comprises failure detection means for detecting generation of a predetermined failure in the electric parking brake apparatus and identifying details of the failure, and is connected to the second control unit to output to the second control unit a signal corresponding to the details of the failure.

10. An electric parking brake apparatus according to claim 9, wherein the second control unit includes an onboard diagnosis function for diagnosing the details of the failure relating to the electric parking brake apparatus.

11. An electric parking brake apparatus according to claim 8, wherein the electric parking brake control unit comprises failure detection means for detecting generation of a predetermined failure in the electric parking brake apparatus and identifying details of the failure, and is connected to the second control unit to output to the second control unit a signal corresponding to the details of the failure.

12. An electric parking brake apparatus according to claim 11, wherein the second control unit includes an onboard diagnosis function for diagnosing the details of the failure relating to the electric parking brake apparatus.

13. An electric parking brake apparatus comprising:

a parking brake of a vehicle, the parking brake being of the type which does not utilize fluid pressure for generating parking brake force;

an electric driver for activating and deactivating the parking brake;

manually operated member for generating activation and deactivation signals which instruct activation and deactivation of the parking brake, respectively; and an electric parking brake control unit for controlling the electric drive means on the basis of the signals, the electric parking brake control unit including an input section for receiving signals output from a second control unit mounted on the vehicle and instructing automatic activation and automatic deactivation of the parking brake, wherein the parking brake can be automatically activated and deactivated in the absence of the generation of activation and deactivation signals, respectively, by the manually operated member;

wherein the electric parking brake control unit comprises failure detection means for detecting generation of a predetermined failure in the electric parking brake apparatus and identifying details of the failure, and is connected to the second control unit to output to the second control unit a signal corresponding to the details of the failure; and wherein the second control unit includes an onboard diagnosis function for diagnosing the details of the failure relating to the electric parking brake apparatus.

14. An electric parking brake apparatus comprising:

a parking brake of a vehicle, the parking brake being of the type which does not utilize fluid pressure for generating parking brake force;

an electric driver for activating and deactivating the parking brake;

manually operated member for generating activation and deactivation signals which instruct activation and deactivation of the parking brake, respectively; and an electric parking brake control unit for controlling the electric drive means on the basis of the signals, the electric parking brake control unit including an input section for receiving signals output from a second control unit mounted on the vehicle and instructing automatic activation and automatic deactivation of the parking brake, wherein the parking brake can be automatically activated and deactivated in the absence of the generation of activation and deactivation signals, respectively, by the manually operated member;

wherein the parking brake is of the type which utilizes tension of a wire for generating the parking brake force, and the electric drive means is a motor for adjusting the tension of the wire;

wherein the electric parking brake control unit comprises failure detection means for detecting generation of a predetermined failure in the electric parking brake apparatus and identifying details of the failure, and is connected to the second control unit to output to the second control unit a signal corresponding to the details of the failure; and wherein the second control unit includes an onboard diagnosis function for diagnosing the details of the failure relating to the electric parking brake apparatus.

* * * * *